United States Patent
Kursun

(10) Patent No.: US 11,102,092 B2
(45) Date of Patent: Aug. 24, 2021

(54) PATTERN-BASED EXAMINATION AND DETECTION OF MALFEASANCE THROUGH DYNAMIC GRAPH NETWORK FLOW ANALYSIS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 83 days.

(21) Appl. No.: 16/200,050

(22) Filed: Nov. 26, 2018

(65) Prior Publication Data

US 2020/0169483 A1 May 28, 2020

(51) Int. Cl.
| | |
|---|---|
| *H04L 12/26* | (2006.01) |
| *H04L 12/24* | (2006.01) |
| *G06F 9/50* | (2006.01) |
| *H04L 29/08* | (2006.01) |

(52) U.S. Cl.
CPC ............ *H04L 43/045* (2013.01); *G06F 9/505* (2013.01); *G06F 9/5038* (2013.01); *H04L 41/142* (2013.01); *H04L 41/16* (2013.01); *H04L 67/10* (2013.01); *G06F 2209/508* (2013.01); *G06F 2209/5011* (2013.01)

(58) Field of Classification Search
CPC ....... G06F 2209/5011; G06F 2209/508; G06F 9/5038; G06F 9/505; H04L 41/142; H04L 41/16; H04L 43/045; H04L 67/10
See application file for complete search history.

(56) References Cited

U.S. PATENT DOCUMENTS

| | | | |
|---|---|---|---|
| 6,597,777 B1* | 7/2003 | Ho | ....................... H04L 41/0896 370/235 |
| 6,684,190 B1 | 1/2004 | Powers et al. | |
| 7,562,814 B1* | 7/2009 | Shao | ..................... G06F 21/552 235/375 |
| 9,087,088 B1* | 7/2015 | Bose | ....................... G06F 16/22 |
| 9,454,785 B1* | 9/2016 | Hunter | .................. G06F 16/285 |
| 9,485,265 B1 | 11/2016 | Saperstein et al. | |
| 9,558,031 B2 | 1/2017 | Cismas et al. | |
| 9,785,934 B2 | 10/2017 | Davis et al. | |
| 9,967,265 B1* | 5/2018 | Peer | ........................ H04L 63/20 |
| 10,318,741 B2 | 6/2019 | Zhang | |

(Continued)

*Primary Examiner* — Dhairya A Patel
*Assistant Examiner* — Sandarva Khanal
(74) *Attorney, Agent, or Firm* — Michael A. Springs; Moore & Van Allen PLLC; Nicholas C. Russell

(57) ABSTRACT

A system is configured for extracting historical information for a first plurality of resource pools, generating a historical dynamic graph based on the historical information, identifying from the historical information, a historical set of resource distribution events associated with a malfeasance, determining from the historical dynamic graph, at least one historical malfeasance pattern, receiving current resource distribution request information for a second plurality of resource pools, generating a current dynamic graph comprising a current plurality of nodes and a current plurality of edges, monitoring the current dynamic graph and identify a current malfeasance pattern, and executing one or more remediation actions on one or more of the second plurality of resource pools associated with the current dynamic graph.

14 Claims, 13 Drawing Sheets

(56) References Cited

U.S. PATENT DOCUMENTS

| | | | |
|---|---|---|---|
| 10,419,469 B1* | 9/2019 | Singh | H04L 43/06 |
| 10,445,738 B1* | 10/2019 | Waters | H04L 63/1425 |
| 10,528,958 B2* | 1/2020 | Yang | G06Q 20/12 |
| 10,673,712 B1* | 6/2020 | Gosar | H04L 41/5096 |
| 10,755,281 B1 | 8/2020 | Yip et al. | |
| 2002/0091624 A1* | 7/2002 | Glodjo | G06Q 20/10 |
| | | | 705/37 |
| 2002/0138417 A1 | 9/2002 | Lawrence | |
| 2002/0194119 A1* | 12/2002 | Wright | G06Q 30/0609 |
| | | | 705/38 |
| 2003/0167237 A1* | 9/2003 | Degen | G06Q 20/10 |
| | | | 705/64 |
| 2006/0085370 A1* | 4/2006 | Groat | G06Q 40/00 |
| 2006/0149674 A1* | 7/2006 | Cook | G06Q 40/02 |
| | | | 705/44 |
| 2007/0088652 A1 | 4/2007 | Firmage et al. | |
| 2007/0162349 A1 | 7/2007 | Silver | |
| 2007/0255632 A1 | 11/2007 | Hatano et al. | |
| 2008/0189164 A1 | 8/2008 | Wiseman | |
| 2009/0099965 A1 | 4/2009 | Grant | |
| 2009/0122065 A1 | 5/2009 | Patil et al. | |
| 2009/0125369 A1* | 5/2009 | Kloostra | G06Q 40/12 |
| | | | 705/35 |
| 2009/0187988 A1 | 7/2009 | Hulten et al. | |
| 2010/0145771 A1* | 6/2010 | Fligler | G06Q 30/02 |
| | | | 705/319 |
| 2011/0225138 A1* | 9/2011 | Johnston | G06Q 40/02 |
| | | | 707/706 |
| 2011/0238516 A1* | 9/2011 | McAfee | G06Q 30/0601 |
| | | | 705/26.1 |
| 2012/0284175 A1 | 11/2012 | Wilson et al. | |
| 2013/0018796 A1* | 1/2013 | Kolhatkar | G06Q 20/28 |
| | | | 705/44 |
| 2013/0073859 A1* | 3/2013 | Carlson | G06Q 20/325 |
| | | | 713/176 |
| 2013/0097463 A1* | 4/2013 | Marvasti | H04L 41/069 |
| | | | 714/47.1 |
| 2013/0110658 A1 | 5/2013 | Lyman et al. | |
| 2013/0332357 A1 | 12/2013 | Green et al. | |
| 2014/0067672 A1 | 3/2014 | Dheer et al. | |
| 2015/0019425 A1 | 1/2015 | Kumar et al. | |
| 2015/0106942 A1 | 4/2015 | Borghetti et al. | |
| 2015/0339835 A1* | 11/2015 | Mohr | G06T 11/206 |
| | | | 345/440 |
| 2016/0155110 A1 | 6/2016 | Wright et al. | |
| 2016/0283715 A1* | 9/2016 | Duke | G06N 20/00 |
| 2016/0292599 A1 | 10/2016 | Andrews et al. | |
| 2016/0364794 A1 | 12/2016 | Chari et al. | |
| 2016/0379309 A1* | 12/2016 | Shikhare | G06Q 40/08 |
| | | | 705/4 |
| 2017/0178139 A1* | 6/2017 | Gieseke | G06Q 20/4016 |
| 2017/0235848 A1* | 8/2017 | Van Dusen | G06F 16/904 |
| | | | 705/12 |
| 2017/0251013 A1 | 8/2017 | Kirti et al. | |
| 2017/0300903 A1 | 10/2017 | Mori et al. | |
| 2018/0197183 A1* | 7/2018 | McBennett | G06Q 20/027 |
| 2019/0042879 A1 | 2/2019 | Munoz | |
| 2019/0132224 A1* | 5/2019 | Verma | H04L 47/2441 |
| 2019/0207976 A1 | 7/2019 | Yadav et al. | |
| 2019/0251234 A1 | 8/2019 | Liu et al. | |
| 2020/0067902 A1 | 2/2020 | Valecha et al. | |
| 2020/0167784 A1 | 5/2020 | Kursun | |
| 2020/0167785 A1 | 5/2020 | Kursun | |
| 2020/0167786 A1 | 5/2020 | Kursun | |
| 2020/0167787 A1 | 5/2020 | Kursun | |
| 2020/0169483 A1 | 5/2020 | Kursun | |

\* cited by examiner

PATTERN-BASED EXAMINATION AND DETECTION OF MALFEASANCE THROUGH DYNAMIC GRAPH NETWORK FLOW ANALYSIS

BACKGROUND

Complex networks of entities, their respective accounts, and connections including transfers between these entities makes it difficult to identify anomalous trends, patterns, and characteristics that may be associated with malfeasance. Implementing deep learning systems specifically designed to analyze and detect particular anomalous trends, patterns, and characteristics across such complex networks can improve the identification success rate and provide an opportunity to address potentially malfeasant interactions in real time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for pattern-based examination and detection of malfeasance through dynamic directed graph network flow analysis. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve a controller for generating directed graphs, detecting a malfeasance pattern based on the generated directed graphs, and executing remediation actions, the controller comprising one or more memory devices with a computer-readable program code stored thereon, one or more communication devices connected to a network, and one or more processing devices, wherein the one or more processing devices execute the computer-readable program code to receive current resource distribution request information for a second plurality of resource pools, wherein the current resource distribution request information is associated with a current set of resource distribution requests that occurred during a second period of time that begins after a beginning of the first period of time, generate a current dynamic graph comprising a current plurality of nodes and a current plurality of edges, wherein each of the current plurality of nodes is associated with at least one of the second plurality of resource pools from the received current resource distribution request information, and wherein each of the current plurality of edges is associated with at least a net resource distribution amount and a net resource distribution direction between two of the current plurality of nodes, wherein the current dynamic graph is a dynamic directed graph or a dynamic undirected graph, monitor the current dynamic graph and identify a current malfeasance pattern from a portion of the current dynamic graph matching at least one historical malfeasance pattern in a historical pattern database based on monitoring the current dynamic graph, wherein the current malfeasance pattern may be associated with a current set of nodes of the current plurality of nodes, a current set of edges of the current plurality of edges, or a combination of the current set of nodes and the current set of edges, wherein the identifying a current malfeasance pattern comprises matching the current dynamic graph with the at least one historical malfeasance pattern at a plurality of hierarchical levels, wherein the plurality of hierarchical levels are associated with each of the current plurality of nodes or a group of the current plurality of nodes, and in response to detecting the current malfeasance pattern, execute one or more remediation actions on one or more of the second plurality of resource pools that are associated with the portion of the current dynamic graph associated with the malfeasance.

In some embodiments, the processing device is further configured to execute computer-readable program code to extract historical resource distribution information for a first plurality of resource pools, wherein the historical resource distribution information is associated with historical resource distribution requests that occurred during a first period of time, generate a historical dynamic graph comprising a plurality of nodes and a plurality of edges, wherein each of the plurality of nodes is associated with at least one of the first plurality of resource pools, and wherein each of the plurality of edges represent the resource distribution information associated with a resource distribution event between two of the plurality of nodes, wherein the historical dynamic graph is a historical dynamic directed graph or a historical dynamic undirected graph, identify, from the historical resource distribution information, a historical set of resource distribution events associated with a malfeasance, determine, from the historical dynamic graph, the at least one historical malfeasance pattern of node characteristics, edge characteristics, and nodal interactions associated with the malfeasance, wherein the at least one historical malfeasance pattern may be associated with a set of nodes of the plurality of nodes, a set of edges of the plurality of edges, or a combination of the set of nodes and the set of edges, and store the at least one historical malfeasance pattern in the historical pattern database.

In some embodiments, the processing device is further configured to execute computer-readable program code to block the second plurality of resource pools from sending resource distribution requests, freeze the second plurality of resource pools from receiving subsequent one or more resource distribution requests, prompt a sender of the subsequent one or more resource distribution requests to provide additional authentication credentials before executing the subsequent one or more resource distribution requests, and transmit a notification associated with the second plurality of resource pools to a third party entity, wherein the notification comprises the current resource distribution request information.

In some embodiments, the processing device is further configured to execute computer-readable program code to identify, from the current dynamic graph, a nodal set of one or more pairs of nodes linked by an edge, based on the nodal set having an aggregate customer entropy and divergence value associated with interconnectivity or common control, collapse the nodal set into a single node that represents the one or more pair of nodes linked by an edge of the second nodal set as if it was a single resource pool.

In some embodiments, the historical resource distribution information and the current resource distribution information comprise resource distribution amount, resource distribution time, payor resource pool information, and payee resource pool information.

In some embodiments, identifying the current malfeasance pattern comprises at least identifying a match between one or more factors of the plurality of nodes associated with the first plurality of resource pools and the current plurality of nodes associated with the second plurality of resource pools, wherein the one or more factors comprise at least one of (1) reputation scores, (2) entropy values, (3) divergence values, (4) frequency of resource distribution requests, (5) timing of the resource distribution requests, (6) resource distribution amounts associated with the resource distribution requests, and (7) connectivity characteristics.

In some embodiments, the processing device is further configured to execute computer-readable program code to receive new set of current resource distribution request information associated with a new set of current resource distribution requests, wherein the new set of current resource distribution requests are associated with second plurality of resource distribution pools, update the current dynamic graph based on the new set of current resource distribution request information, and determine a new malfeasance pattern matching at least one other pattern stored in the historical pattern database.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
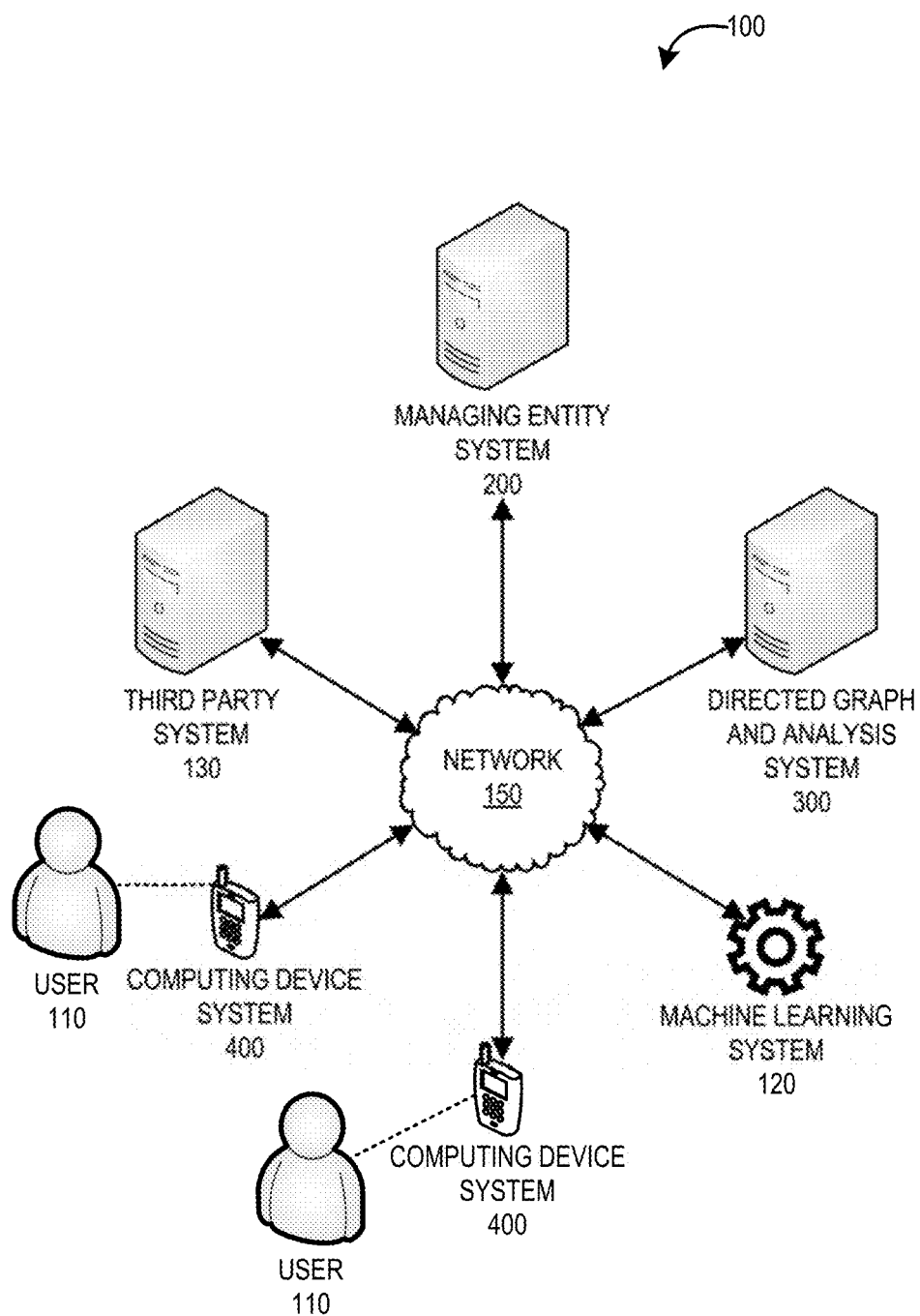
Figure 2:
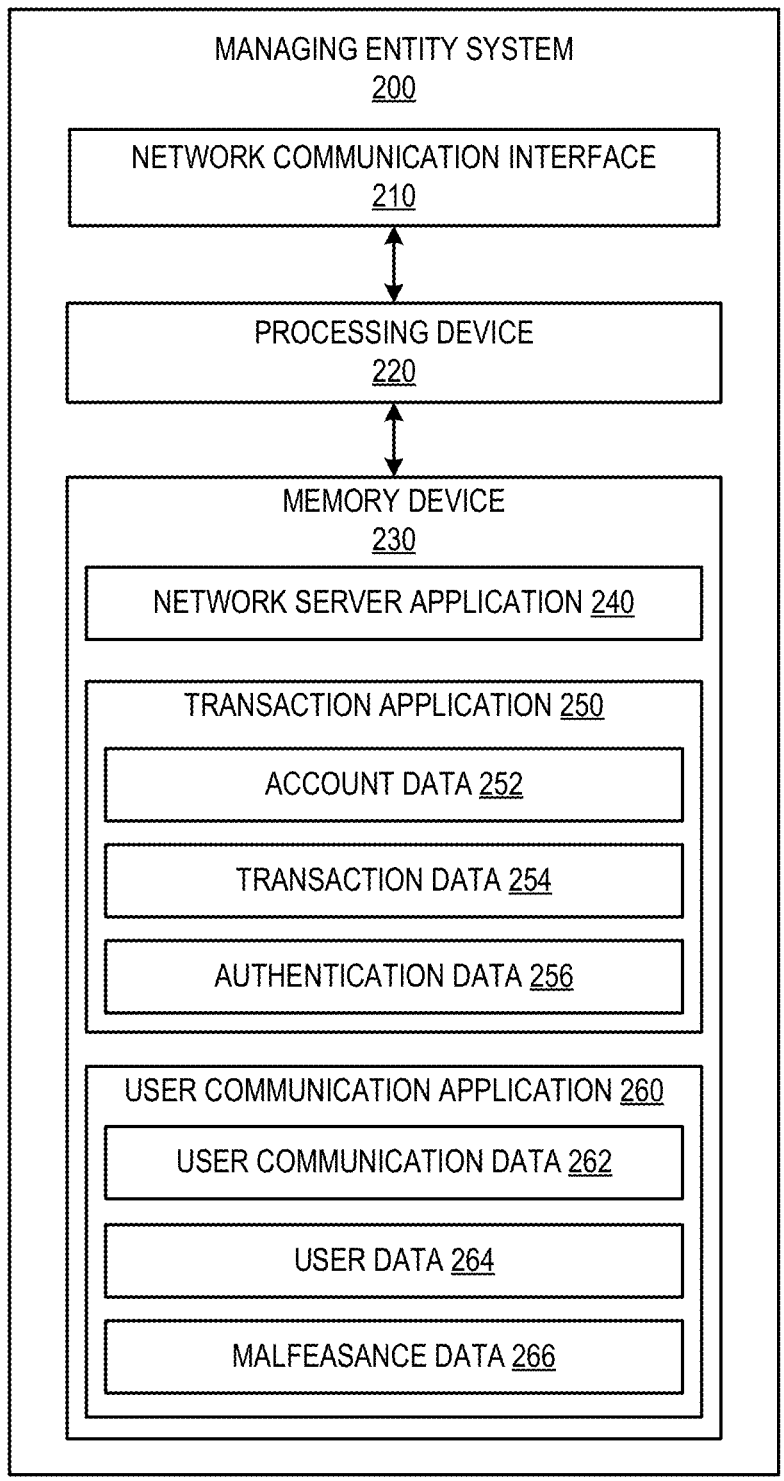
Figure 3:
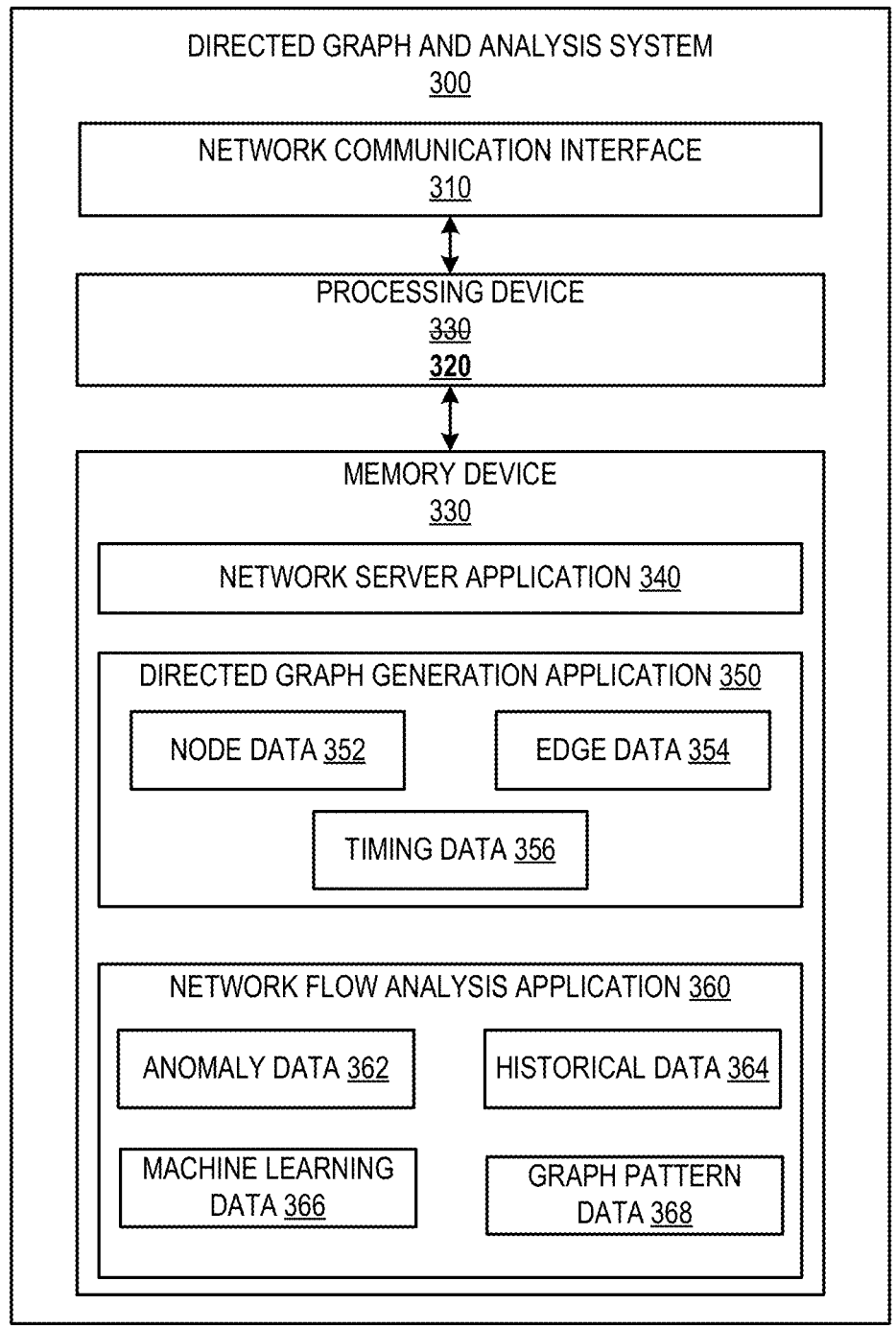
Figure 4:
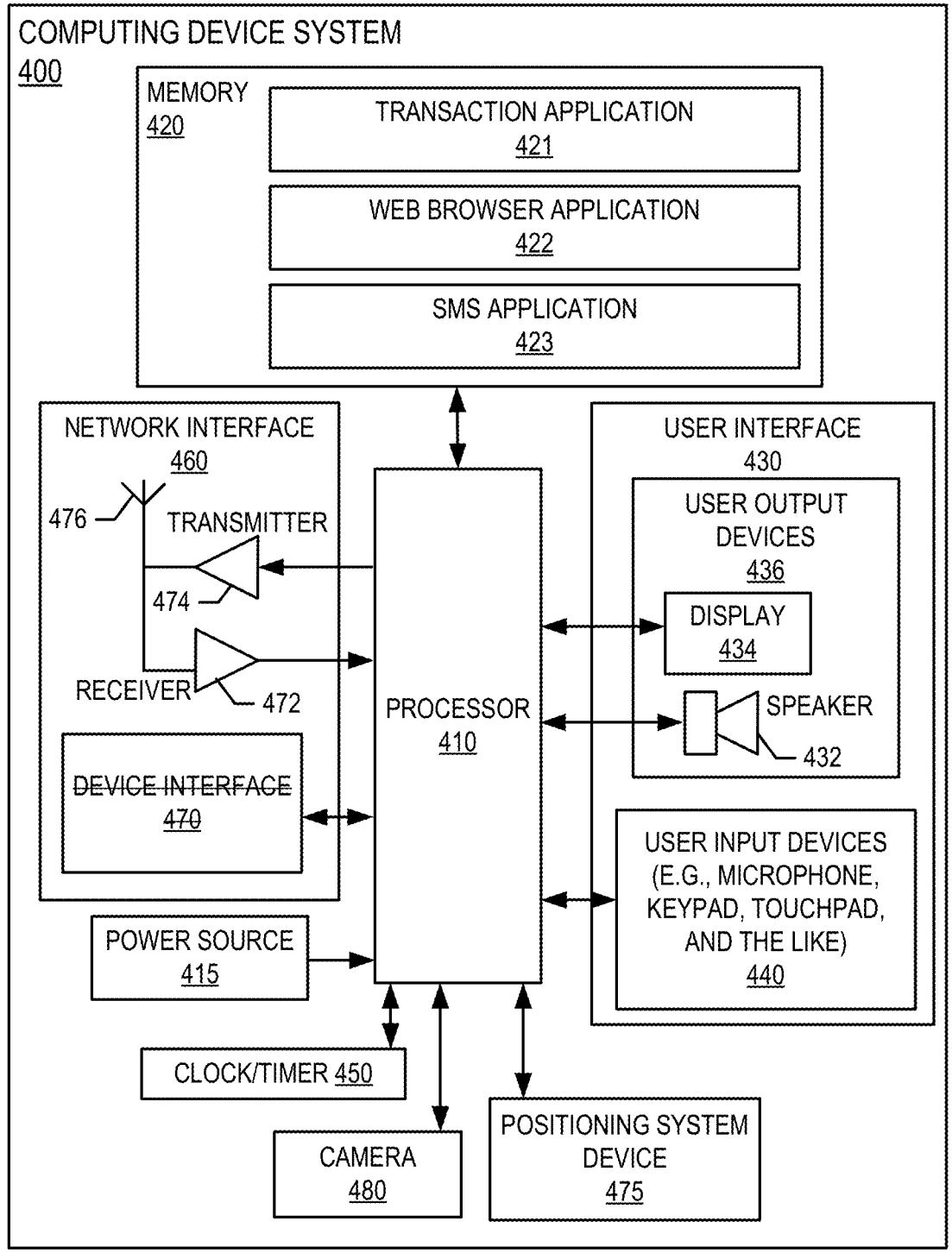
Figure 5:
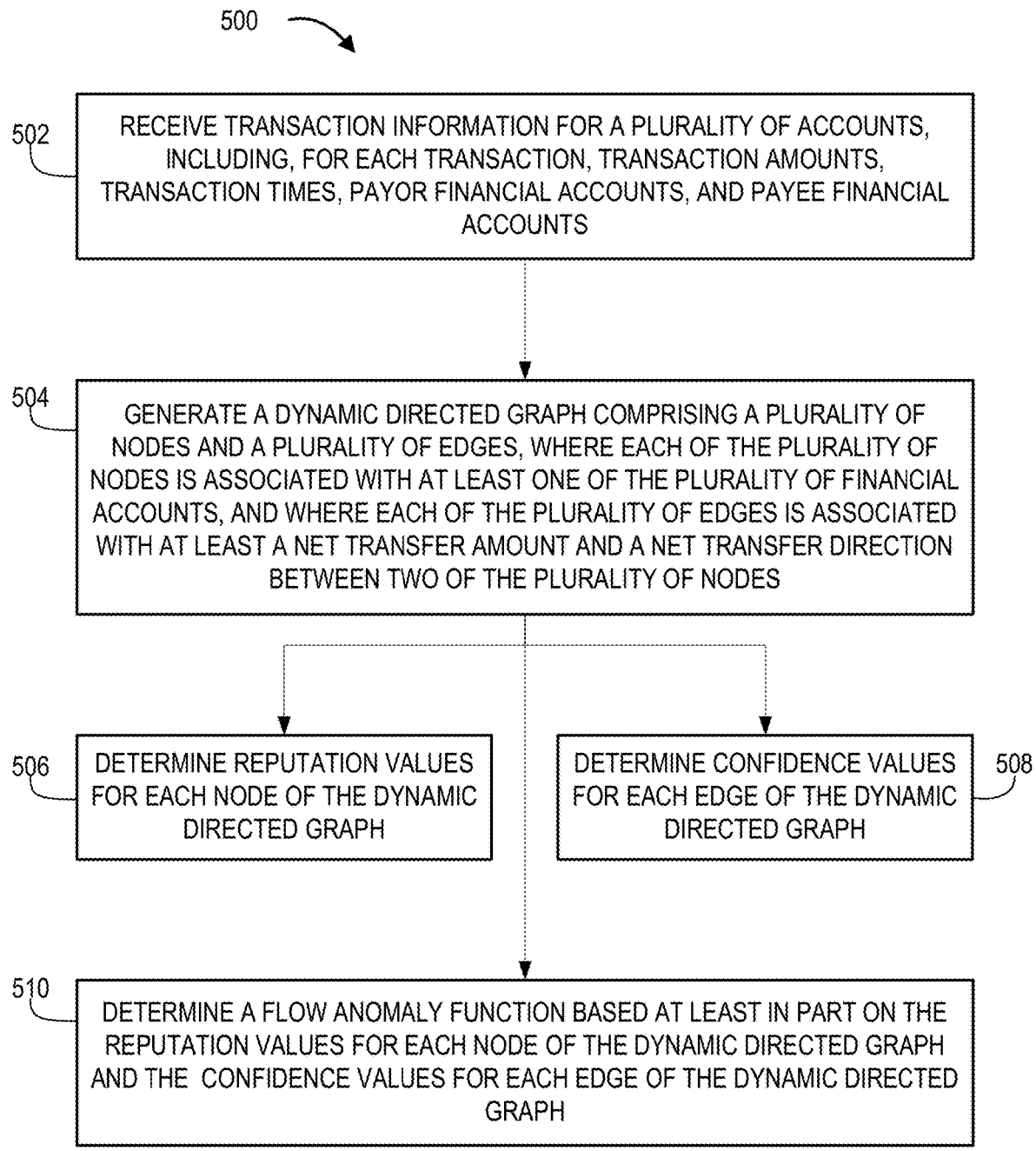
Figure 6:
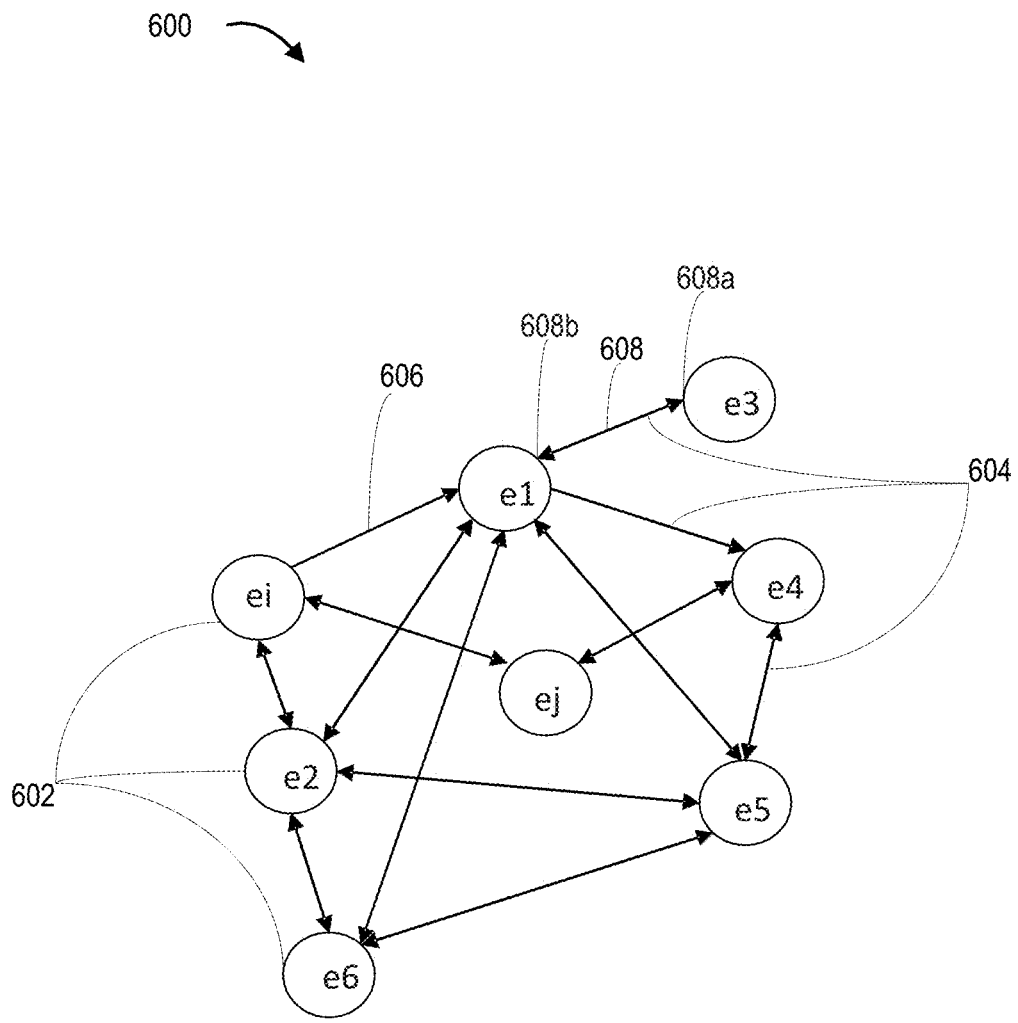
Figure 7A:
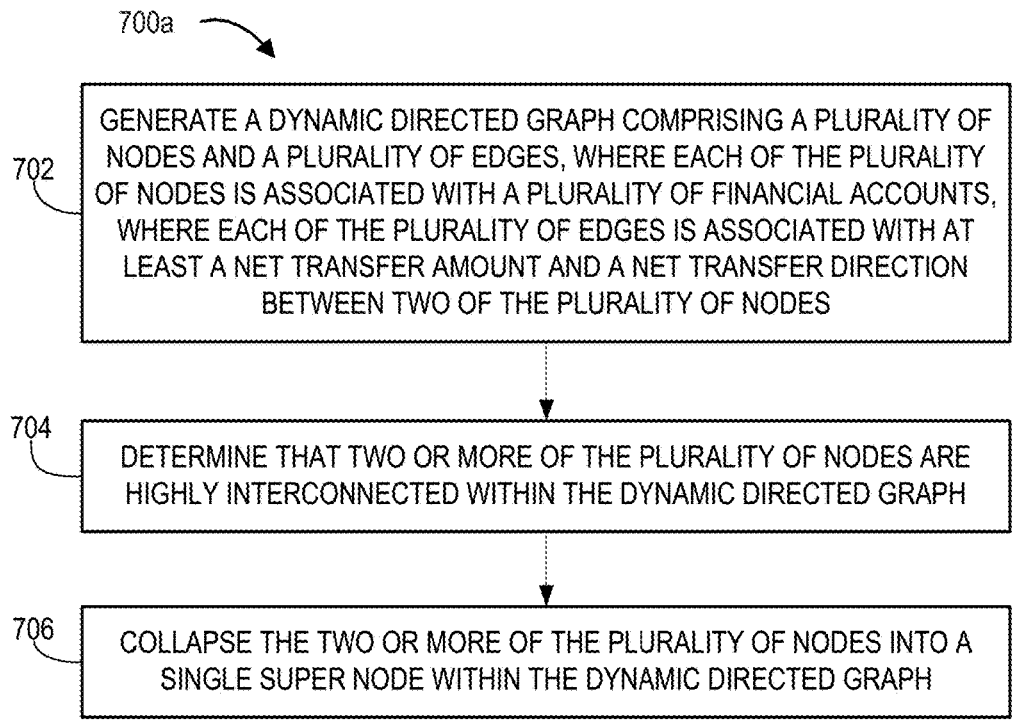
Figures 7B, 7C, 7D:
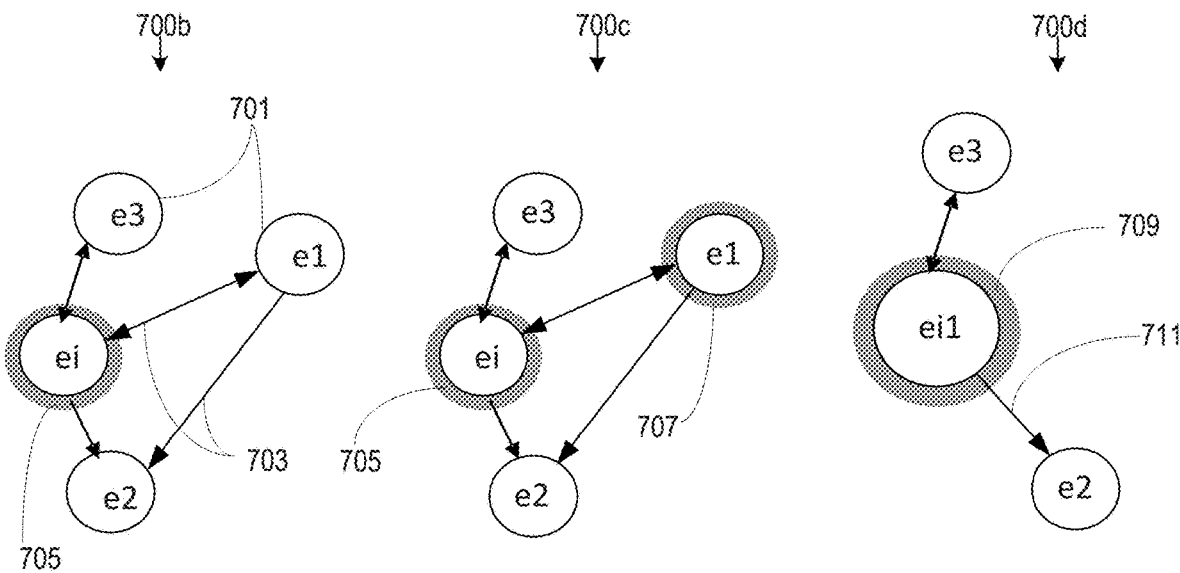
Figure 8:
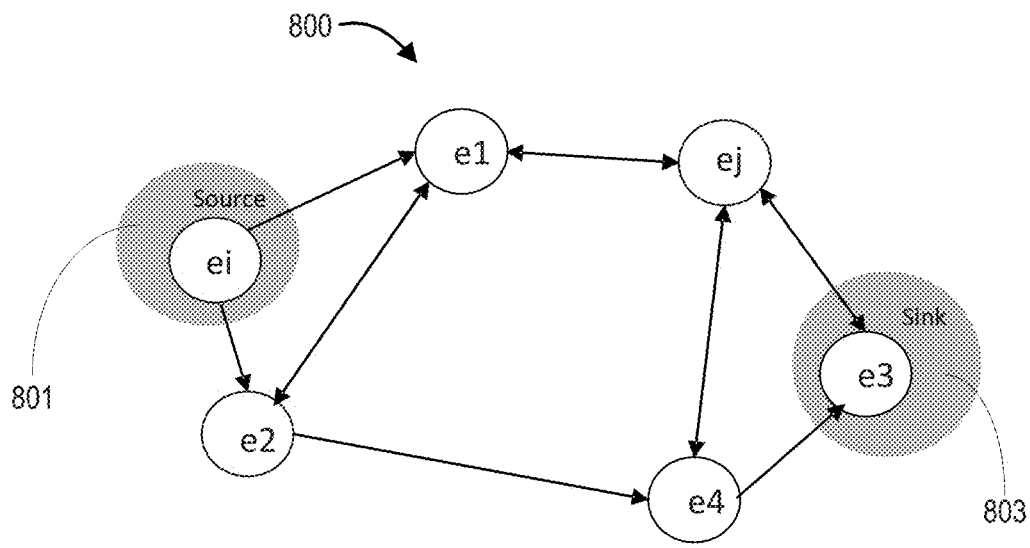
Figure 9:
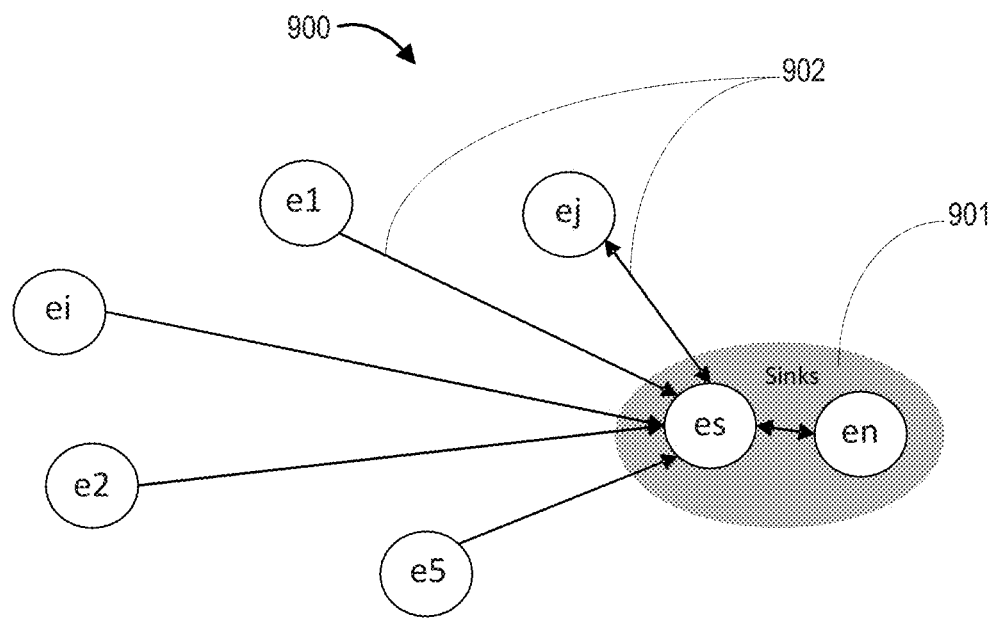
Figure 10:
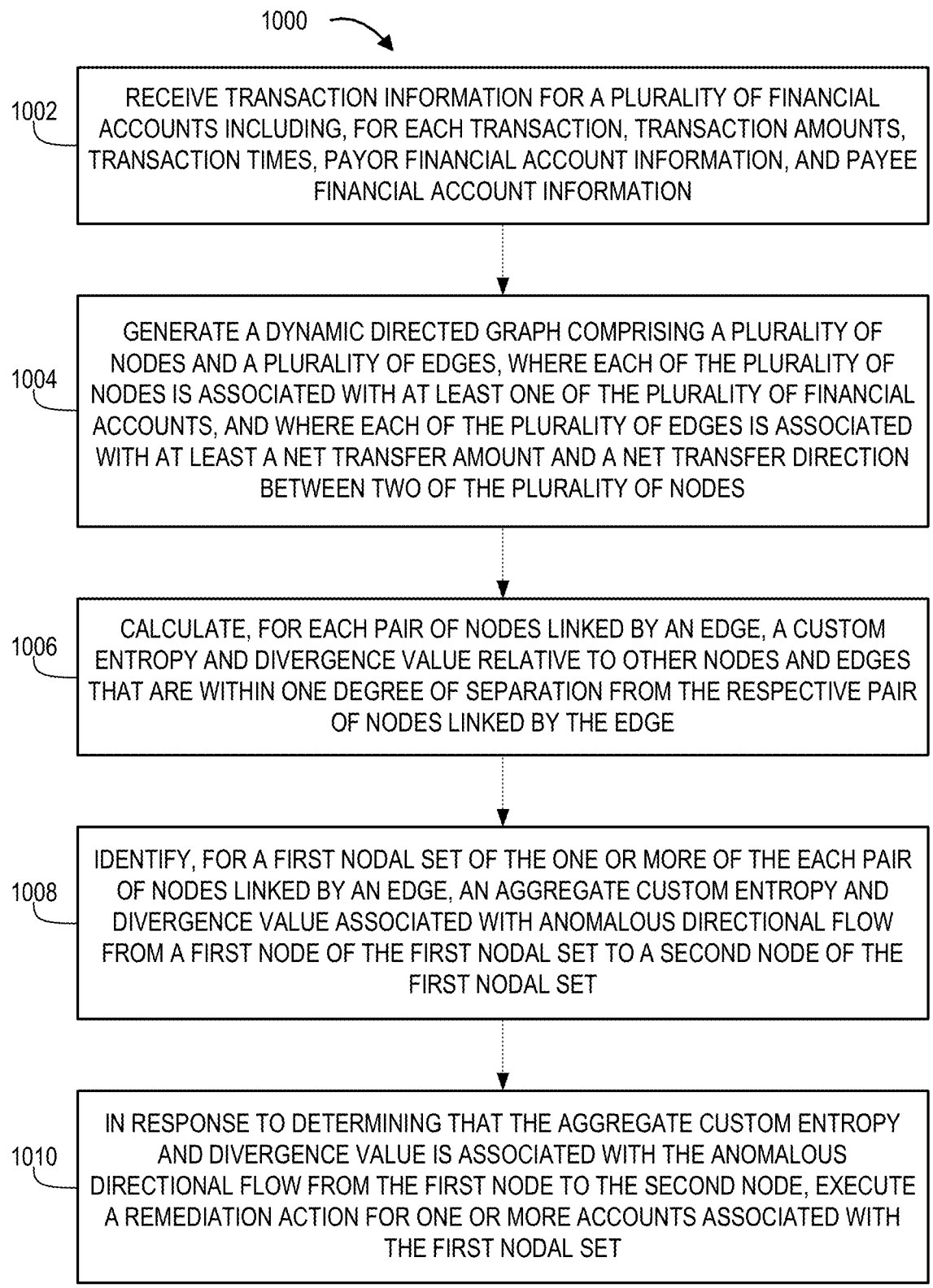
Figure 11:
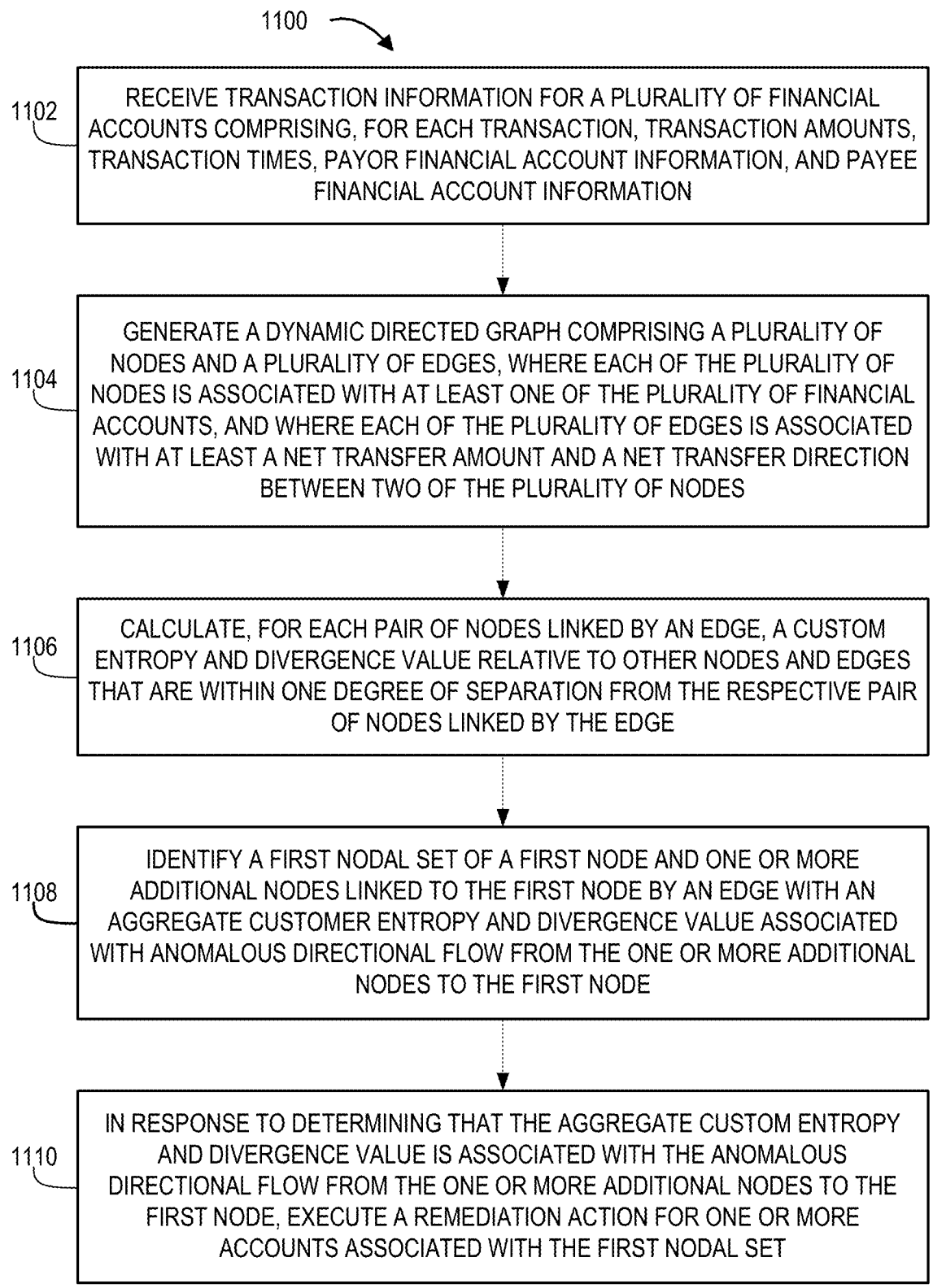
Figure 12:
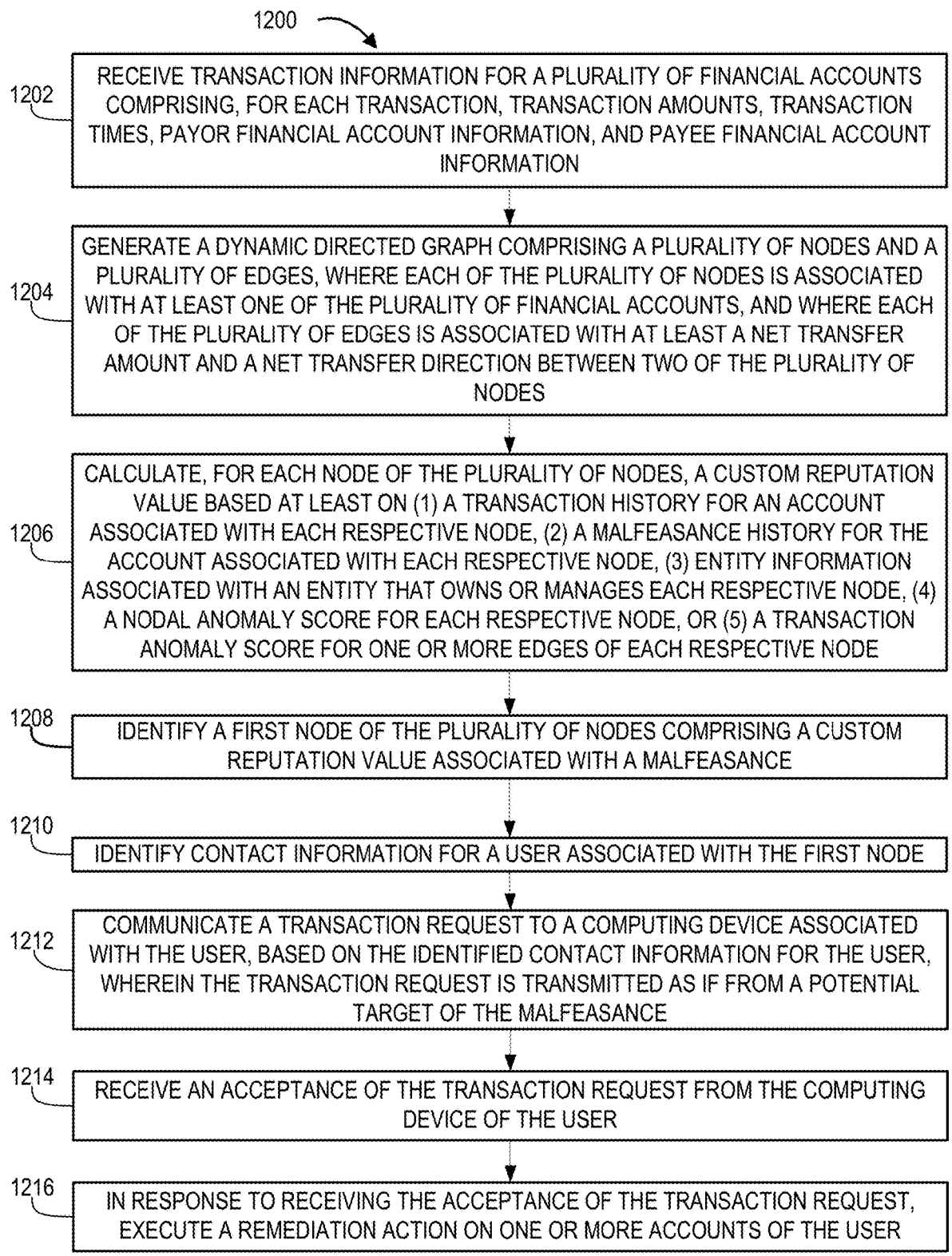
Figure 13:
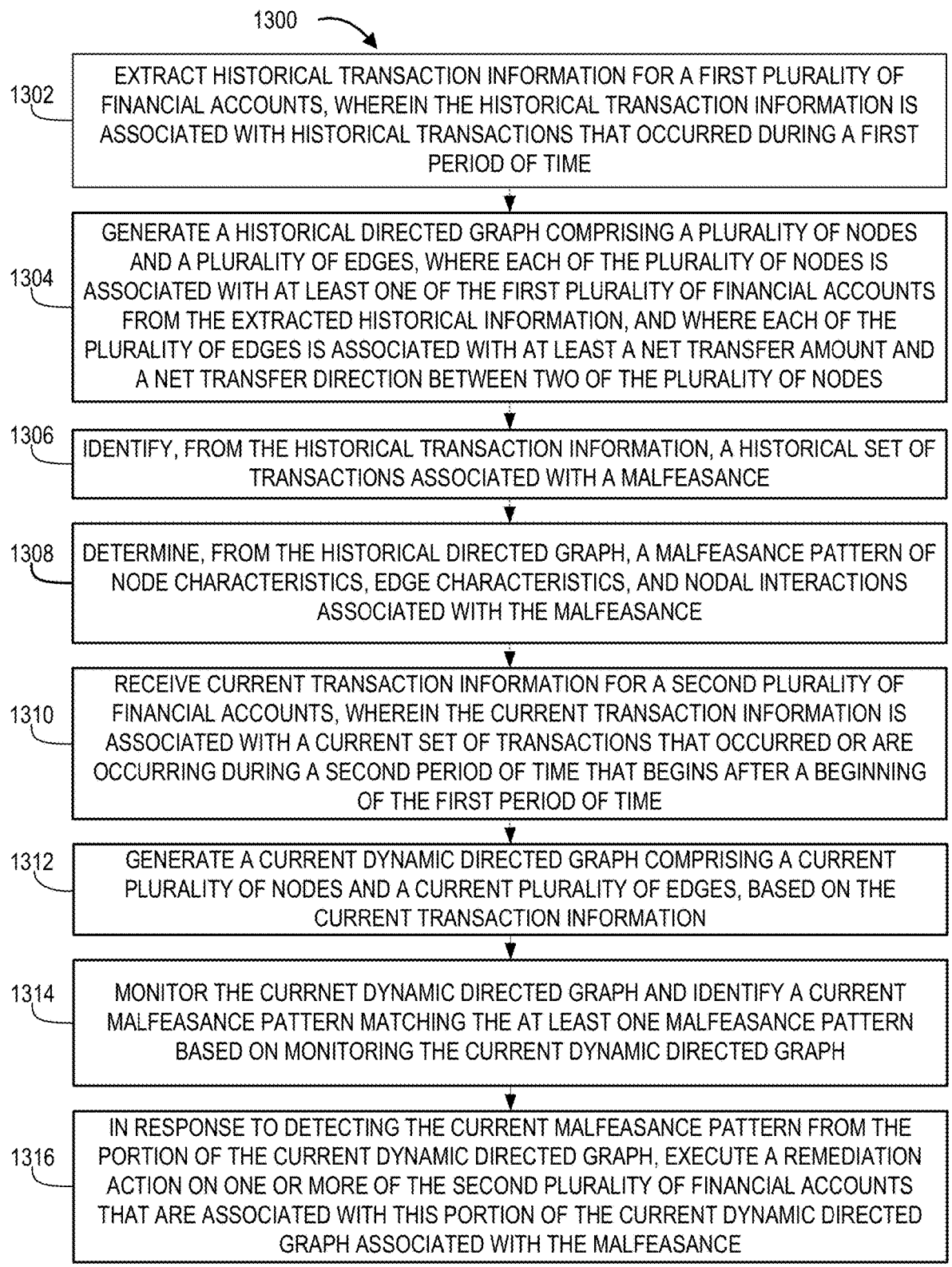
Figure 14:
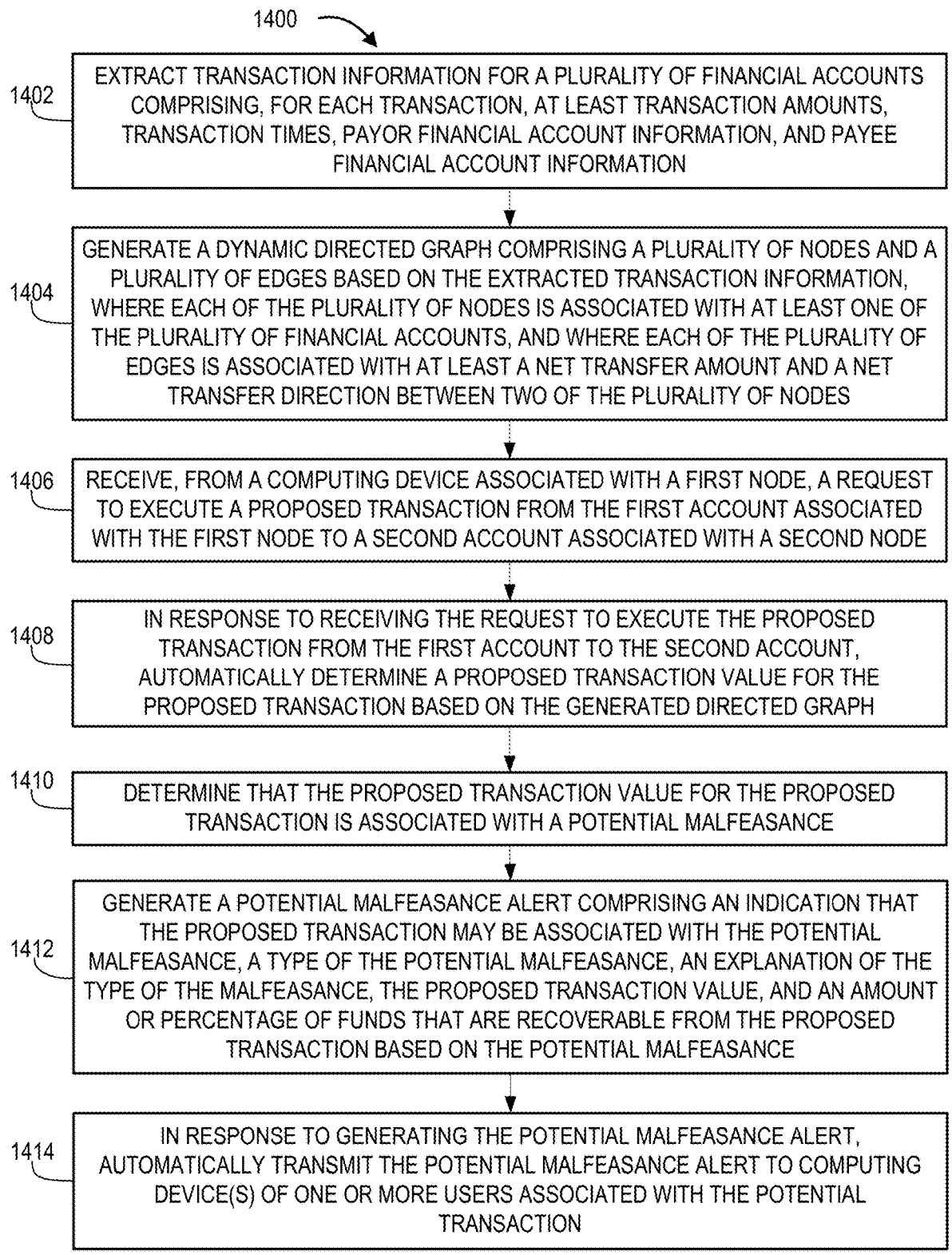

Having thus described embodiments of the invention in general terms, reference will now be made the accompanying drawings, wherein:

FIG. 1 provides a block diagram illustrating a system environment for malfeasance detection through dynamic directed graph-based anomaly and reputation value analysis, in accordance with an embodiment of the invention;

FIG. 2 provides a block diagram illustrating the managing entity system of FIG. 1, in accordance with an embodiment of the invention;

FIG. 3 provides a block diagram illustrating the graph generation and analysis system of FIG. 1, in accordance with an embodiment of the invention;

FIG. 4 provides a block diagram illustrating the computing device system of FIG. 1, in accordance with an embodiment of the invention;

FIG. 5 provides a flowchart illustrating a process for generating a dynamic directed graph and determining reputation values, confidence values, and network flow anomaly functions, in accordance with an embodiment of the invention;

FIG. 6 provides a sample embodiment of a dynamic directed graph, in accordance with an embodiment of the invention;

FIG. 7A provides a flowchart illustrating a process for collapsing multiple nodes of a dynamic directed graph into a single super node of the dynamic directed graph, in accordance with an embodiment of the invention;

FIG. 7B provides a sample portion of a dynamic directed graph, in accordance with an embodiment of the invention;

FIG. 7C provides a sample portion of a dynamic directed graph, in accordance with an embodiment of the invention;

FIG. 7D provides the sample portion of the dynamic directed graph of FIG. 7C, with two nodes collapsed into a single super node, in accordance with an embodiment of the invention;

FIG. 8 provides a sample portion of a dynamic directed graph that illustrates an anomalous directional flow, in accordance with an embodiment of the invention;

FIG. 9 provides a sample portion of a dynamic directed graph that illustrates an anomalous directional flow associated with a sink, in accordance with an embodiment of the invention;

FIG. 10 provides a flowchart illustrating a process for anomaly detection based on dynamic graph network flow analysis, in accordance with an embodiment of the invention;

FIG. 11 provides a flowchart illustrating a process for anomaly detection based on dynamic directed graph network flow analysis, in accordance with an embodiment of the invention;

FIG. 12 provides a flowchart illustrating a process for active malfeasance examination and detection based on dynamic directed graph network flow analysis, in accordance with an embodiment of the invention;

FIG. 13 provides a flowchart illustrating a pattern-based examination and detection of malfeasance through dynamic directed graph network flow analysis, in accordance with an embodiment of the invention; and FIG. 14 provides a flowchart illustrating a process for dynamic graph network flow analysis and real time remediation execution, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for detecting and remediating potential malfeasance interactions through the generation and analysis of dynamic directed graphs of networked accounts and transactions. A dynamic directed graph is generated, where the nodes of the dynamic directed graph represent one or more accounts (e.g., financial accounts, or the like), and the edges of the dynamic directed graph represent transactions between the nodes (i.e., transactions from one account to another account). Each edge may represent a single transaction, or multiple transactions (e.g., an aggregate set of transactions).

The directed graph is dynamically updated as new transactions occur, as new accounts are created, as multiple nodes (i.e., accounts) are identified as similar and collapsed into super nodes, and the like. Each node may be continually analyzed to determine a reputation value or ranking derived from a collection of characteristic analyses to which the reputation value is a hierarch. For example, the collection of characteristic analyses may comprise transaction histories, characteristics of users or entities (e.g., account owners) associated with a node, anomaly values, and flow characteristics.

The transaction histories of nodes may be comprised of or otherwise determined by subordinate information including, but not limited to a node's its association with or engagement in previous malfeasant interactions, nodes that have transacted with an analyzed node in the past (including their characteristics), historical malfeasance reports associated with an analyzed node, a potential or likelihood of a particular node interacting with a node that is associated with malfeasance, or the like. The user(s) or other entity characteristics may be determined or derived based on subordinate information and characteristics like an identity of a user or an entity, a duration of a relationship of the user or entity with a relevant financial institution, a size of a managing entity for an account associated with an analyzed node, historical malfeasance reports associated with the user and/ or entity of an analyzed node, a financial sophistication of an entity associated with the analyzed node, or the like.

The anomaly values may be determined or derived based on subordinate information and analyses such that determine a similarity or divergence of the analyzed node as compared to other nodes in the dynamic directed graph, especially with respect to those nodes within a few degrees of separation. Similarly, the network flow characteristic of the dynamic directed graph that involves an analyzed node may include subordinate information comprising a degree of anomalous flow across a nodal set that includes an analyzed node, as well as comparisons to similar or related nodal sets.

A confidence value can be also determined for each edge or transfer (or grouping of transfers) as a hierarch element that is derived based on a collection of analyzed criteria including, but not limited to, historical information, reported malfeasance history information, connectivity concerns, transaction concerns, account and/or transacting device characteristics, and recoverability values.

Historical characterization information may comprise subordinate information and characteristics including, but not limited to connectivity between the entities of the transacting nodes, amount of time that there has been a connection between the transacting nodes, the amount and/ or frequency of previous transfers between the transacting nodes, and the like. The reported malfeasance history member may be derived based on subordinate information and characteristics including, but not limited to reported malfeasant transactions between two or more nodes, discovered or detected malfeasant transactions between two or more nodes, or other issues in previous transfers between the transacting nodes.

Furthermore, the connectivity concerns element of the confidence value may be derived from or otherwise include subordinate information and characteristics including connection concerns based on social network analysis, nodal proximity analysis to know malfeasant entities and accounts, or the like. Similarly, the transaction concerns may be derived from or otherwise include subordinate information and characteristics of the specific type(s) of transaction conducted between the transacting nodes, the transaction amount(s), transaction frequencies or velocities, or the like.

Additionally, the account or account device characteristics of transacting nodes may be derived based on subordinate information and characteristics including, but not limited to a type of authentication on the payor or payee device, an account balance history, or the like. Finally, the recoverability value may be derived or based on subordinate characteristics or information like a ranking based on the amount that the managing entity (e.g., a financial institution managing the transfer) is responsible for covering in the event of malfeasance, and/or regulations and recoverability potential for a potential transaction or other transfer.

In addition to the nodal reputation values or rankings and the edge confidence values, the dynamic directed graph may be analyzed for multi-node indirection detection. As such, a hierarchical analysis of source and/or sink regions within the dynamic directed graph are performed to detect in-directed malfeasance cases, where the fund transfers are layered with multiple intermediaries across a network path of the dynamic directed graph.

In each of the above-mentioned analyses, or in additional analyses described herein, the system may determine a custom entropy (e.g., information entropy, or Shannon entropy) value for nodes, edges, or sets of a plurality of nodes and edges within a directed graph. This custom entropy value is used to detect anomalous activity on the directed graph from a financial concern perspective. Peer based comparisons (e.g., comparisons of nodes and edges within a few degrees of connection) can be conducted to differentiate anomalous nodes and edges based on this review.

FIG. 1 provides a block diagram illustrating a system environment 100 for detecting and remediating potential malfeasance interactions through the generation and analysis of dynamic directed graphs of networked accounts and transactions, in accordance with an embodiment of the invention. As illustrated in FIG. 1, the environment 100 includes a managing entity system 200, a graph generation and analysis system 300, a machine learning system 120, one or more computing device systems 400, and one or more third party systems 130. One or more users 110 may be included in the system environment 100. In some embodiments, the users 110 of the system environment 100 may be customers of the managing entity system 200 or other entities (e.g., financial institutions) that provide transaction applications or otherwise facilitate the transfer of funds and/or information from an account of one user 110 to an account of the other user. In some embodiments, a user 110 may be an employee of the managing entity system 200, where the user 110 is specially trained to interpret information from a dynamic directed graph to identify and/or establish mitigation actions in response to a detection of a potential malfeasance action. These users 110 may communicate with the other systems of the system environment 100 through user interfaces of computing device systems 400.

The managing entity system 200, the graph generation and analysis system 300, the machine learning system 120, the computing device systems 400, and/or the third party system 130 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the graph generation and analysis system 300, the machine learning system 120, the one or more computing device systems 400, and/or the third party system 130 across the network 150. For example, the managing entity system 200 may perform at least some of the process steps described with respect to FIG. 5, FIG. 7A, FIG. 10, FIG. 11, FIG. 12, or FIG. 13, or may cause one or more other systems described herein to perform one or more of these process steps. In some embodiments, the managing entity system 200 may be a controller that is configured to perform (or instruct other systems to perform) one or more other process steps described herein. The managing entity system 200 is described in more detail with respect to FIG. 2.

The graph generation and analysis system 300 may be a system owned or controlled by the managing entity and/or a third party that specializes in generating and/or analyzing dynamic directed graphs based on at least account and transaction information. While the graph generation and analysis system 300 may be a separate system from the managing entity system 200, in some embodiments, at least a portion of the graph generation and analysis system 300 may be a component of, or otherwise controlled by, the managing entity system 200. In general, the graph generation and analysis system 300 is configured to communicate information or instructions with the managing entity system 200, the machine learning system 120, the computing device systems 400, and/or the third party system 130 across the network 150. The graph generation and analysis system 300 may be configured to perform (or instruct other systems to perform) one or more process steps described herein. The graph generation and analysis system 300 is described in more detail with respect to FIG. 3.

The computing device systems 400 may be systems owned or controlled by the managing entity and/or the users 110. Each computing device system 400 may comprise a personal computer, a laptop computer, a workstation, an electronic kiosk, an automated teller machine (ATM), a point of sale device, a mobile device (e.g., a mobile phone, a mobile tablet, a wearable device, or the like), or any other computing device that provides at least some communication between a user 110 and the other systems of the system environment 100. In general, the computing device systems 400 are configured to communicate information or instructions with the managing entity system 200, the graph generation and analysis system 300, the machine learning system 120, and/or any third party system 130 across the network 150. The computing device systems 400 may be configured to perform (or instruct other systems to perform) one or more of the process steps described herein. One example of a computing device system 400 is described in more detail with respect to FIG. 4.

The machine learning system 120 may comprise a network communication interface, a processing device, and one or more memory devices, where the processing device are configured to perform certain actions with the memory devices and communicate these actions to the managing entity system 200, the graph generation and analysis system 300, the computing device systems 400, and/or one or more third party systems 130 across the network 150. The machine learning system 120 may include a knowledge base, a set of dynamic directed graph analysis rules (e.g., rules based on a learning classifier system, rules based on an association rule learning system, or the like), and any other sets of data, rules, guidelines, boundaries, and any other information that can be utilized to analyze a dynamic directed graph as described herein.

As such, the machine learning system 120 may be configured to receive or access a dynamic directed graph from the graph generation and analysis system 300, make a determination or calculation based on the dynamic directed graph and the machine learning rules and/or knowledge base of the machine learning system 120, and return the calculations or determinations (i.e., the analysis) to the graph generation and analysis system 300.

This machine learning system 120 may comprise a deep learning system like a deep neural network-based system in addition to other machine learning functions like decision trees and regression techniques. In some embodiments, this deep neural network may comprise 3, 4, or more layers, and may comprise one or more of an autoencoder, a multilayer perceptron ("MLP") a recurrent neural network ("RNN"), a convolutional deep neural network ("CNN"), a Boltzmann machine, and the like.

In some embodiments, the machine learning system 120 is a separate system from the graph generation and analysis system 300. However, in other embodiments, at least a portion of the machine learning system 120 is a component of the graph generation and analysis system 300.

The third party system 130 may be any system that is in network communication with the other systems of the system environment 100, via the network 150. A third party system 130 may be any system that provides resources, provides information, receives reports, or otherwise interacts with the other systems of the system environment 100 as described herein. For example, a third party system 130 may comprise a data repository of machine learning or artificial intelligence rules, historical transaction data, or the like. Additionally or alternatively, a third party system 130 may comprise a system of a regulatory or government body that is configured to receive reports (e.g., a report of a potential or known malfeasance, as determined through analysis of a dynamic directional graph representing accounts and transactions) from the managing entity system 200, the graph generation and analysis system 300, and/or a computing device system 400.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a transaction application 250 which includes account data 252, transaction data 254, and authentication data 256, and a user communication application 260 which includes user communication data 262, user data 264, and malfeasance data 266.

The computer-executable program code of the network server application 240, the transaction application 250, and/or the user communication application 260 may instruct the processing device 220 to perform certain logic, data-processing, and data-storing functions of the managing entity system 200 described herein, as well as communication functions of the managing entity system 200.

The transaction application 250 may be an application managed, controlled, or enrolled in, or otherwise associated with the managing entity that controls the managing entity system 200, and is configured to initiate, authenticate, and execute transactions or other transfers between at least two accounts. In some embodiments, the transaction application is a peer to peer ("P2P") transaction application that is used by customers (e.g., users 110) via computing device systems 400 to transfer funds and/or information from one account and/or computing device to another account and/or computing device. Of course, the transaction application may be any application that facilitates the transfer of funds from one account to another account and/or of information from one computing device to another computing device.

In one embodiment, the transaction application 250 includes account data 252, transaction data 254, and authentication data 256. The account data 252 may be associated with financial accounts of customers of the managing entity. For each account, this account data 252 may include, but is not limited to, account ownership information, historical account information, account type, balance information, historical balance information, balance trend information, a date that the account was opened, related accounts (e.g., accounts with a common owner), know your customer information for one or more individuals or entities associated with the account, investment information, and the like. The account data 252 may additionally or alternatively be associated with reputation values, historical reputation values (e.g., reputation values at different points in time, minimum historical reputation values (e.g., a reputation value for the account, a reputation value for a directed graph node associated with the account, a reputation value for one or more owners of the account, or the like), maximum historical reputation values, or the like), anomaly values (i.e., anomaly values of one or more nodes associated with each account), or historical anomaly values (e.g., anomaly values at different points in time, minimum anomaly values, maximum anomaly values, or the like).

The transaction data 254 may comprise information associated with transactions, transfers, or other interactions between an account and one or more other accounts. As such, the transaction data 254 may include, but is not limited to, transaction amounts transferred from payor accounts to payee accounts, historical transaction amounts, transaction times, goods or services associated with each transaction, location of a seller associated with each transaction, location of a purchaser associated with each transaction, location (e.g., geographical region or jurisdiction) associated with payor and/or payee accounts of each transaction, a frequency of similar transactions, a frequency of transfers from one or more related accounts, a frequency of transfers to one or more related accounts, confidence values of each transaction (e.g., a value that is associated with the likelihood of a malfeasant transaction), historical confidence values for each transaction, and the like.

The authentication data 256 may comprise stored, confirmed authentication credentials of users associated with the accounts, received authentication credentials from users executing transactions, rules for comparing received authentication credentials against stored or otherwise known authentication credentials, and the like.

The transaction application 250 is configured to utilize the account data 252, transaction data 254, and authentication data 256, and any other required information to manage a transaction portal and execute transactions of funds between two accounts and/or a transfer of information (e.g., messages, invoices, descriptions or explanations of the transaction, product descriptions, service descriptions, warranty information, receipt information, or the like) between two accounts and/or computing device systems 400.

As described above, the user communication application 260 may include user communication data 262, user data 264, and/or malfeasance data 266. The user communication data 262 may comprise contact information for users (e.g., phone numbers, email addresses, physical home addresses, physical work addresses, messaging application usernames, or the like), user preferences on when to be contacted and/or how often to be contacted, communicating device types associated with one or more communication methods (e.g., mobile phone, work computer, tablet, smart watch, ATM, point of sale device, or the like), or any other information that the managing entity system 200 may utilize to establish a communication link with a user and communicate information, messages, requests for authentication credentials, transferred authentication credentials, and the like.

The user data 264 may comprise information about each user that is associated with each account, particularly for the purpose of identifying a user associated with an account, to communicate with the user that is associated with an account, and to identify different accounts that have similarities that indicate ownership by the same individual, group of individuals, or entity. As such, the user data 264 may include, but is not limited to, name information, address information, contact information, associations (e.g., ownership or control) with one or more accounts, and the like.

The malfeasance data 266 may comprise information about known malfeasances, detected malfeasances, detected potential malfeasances, historical malfeasances, patterns associated with previously identified malfeasant actions or transactions (e.g., patterns within dynamic directed graphs), and the like. The malfeasance data 266 may include reports of malfeasance (e.g., received or generated), contact information for agencies to which malfeasance reports should be provided, information that is to be populated in malfeasance reports, and the like. As the generated directed graphs can be analyzed to identify multiple types of malfeasance, these different malfeasance types, the techniques used to detect the malfeasances (or potential malfeasances), and the like may additionally or alternatively stored as malfeasance data 266 within the managing entity system 200.

The user communication application 260 may utilize the user communication data 262, the user data 264, and the malfeasance data 266 to receive reports of malfeasance (or receive information about potential malfeasances, compare that information to the malfeasance data 266, and determine a likelihood as to whether a malfeasance is occurring or has occurred), to communicate with users associated with potential malfeasances (e.g., to notify or warn users of a potential malfeasance, to inform a user that a malfeasance has occurred in a transaction associated with that user, to notify a user that a pending transaction could be associated with a malfeasance, and the like), and to report potential malfeasances to government or regulatory agencies.

The network server application 240, the transaction application 250, and the user communication application 260 are configured to invoke or use the account data 252, the transaction data 254, the authentication data 256, the user communication data 262, the user data 264, and the malfeasance data 266, along with any other data or information received from the graph generation and analysis system 300, the machine learning system 120, the computing device systems 400, and/or a third party system 130 when communicating through the network communication interface 210 with the graph generation and analysis system 300, the machine learning system 120, the computing device systems 400, and/or a third party system 130 to perform one or more of the process steps described herein.

FIG. 3 provides a block diagram illustrating the graph generation and analysis system 300, in greater detail, in accordance with embodiments of the invention. As illustrated in FIG. 3, in one embodiment of the invention, the graph generation and analysis system 300 includes one or more processing devices 320 operatively coupled to a network communication interface 310 and a memory device 330. In certain embodiments, the graph generation and analysis system 300 is operated by a first entity, such as a financial institution, while in other embodiments, the graph generation and analysis system 300 is operated by an entity other than a financial institution.

It should be understood that the memory device 330 may include one or more databases or other data structures/repositories. The memory device 330 also includes computer-executable program code that instructs the processing device 320 to operate the network communication interface 310 to perform certain communication functions of the graph generation and analysis system 300 described herein. For example, in one embodiment of the graph generation and analysis system 300, the memory device 330 includes, but is not limited to, a network server application 340, a graph generation application 350, a network flow analysis application 360, and other computer-executable instructions and data. The computer-executable program code of the network server application 340, the graph generation application 350, and/or the network flow analysis application 360 may instruct the processing device 320 to perform certain logic, data-processing, and data-storing functions of the graph generation and analysis system 300 described herein, as well as communication functions of the graph generation and analysis system 300.

The graph generation application 350 is configured to be executed by the graph generation and analysis system 300 (e.g., as instructed by the managing entity system 200) to collect a large set of information and data, and compile that information and data to generate a directed graph of nodes and edges, where the nodes are associated with at least one account of a financial transaction network, and each edge represents one or more transactions (or an aggregate set of transactions) or other transfers between two nodes.

In one embodiment, the graph generation application 350 includes node data 352, edge data 354, and timing data 356, although it should be known that additional data or information may be stored within, or is otherwise accessible to, the graph generation application 350 (e.g., historical data). The node data 352 comprises the information that the graph generation and analysis system 300 needs to cause the graph generation application 350 to establish, generate, create, or otherwise distinguish a plurality of nodes for the directed graph. In many embodiments, each of the plurality of nodes is associated with one or more financial accounts, transaction accounts, or users. As such, the node data 352 may include, but is not limited to, account data, account information, account balance information, information about a user that controls the account, information about a user that owns the account, reputation values associated with the account and/or the node historically, location information about the account or the residence or citizenship of the owner (or owner entity) of the account, and the like.

The edge data 354 comprises the information that the graph generation and analysis system 300 needs to cause the graph generation application 350 to establish, generate, create, or otherwise distinguish a plurality of edges for the directed graph. These edges may represent single transactions or other transfers between the nodes of the directed graph. In other embodiments, these edges may represent an aggregation of transactions over a period of time (e.g., over all time, over the past five years, over the past year, over the past month, over the past week, over the past hour, or the like). A transaction between nodes may comprise a financial transaction or transfer of funds from a first nodes (representing a first, payor account) to a second account (representing a second, payee account). As such, the edge data 354 may comprise, but is not limited to, transaction amount data, transaction timing data, transaction frequency data, payor account (or node) information, payee account (or node) information, transaction malfeasance information (e.g., confidence values for each transaction or set of transactions represented by one or more edges), and the like. The timing data 356 may comprise any information associated with when transactions that are represented in a generated directed graph occurred, timing of when accounts were opened, timing between when an account was opened and a particular transaction or set of transactions, historical information about the directed graph (e.g., a status or layout of the directed graph at multiple points in time), timing information for how long it takes a user to provide authentication credentials in the execution of a transaction, and the like.

The network flow analysis application 360 (which may be a component of the graph generation application 350) is configured to be executed by the graph generation and analysis system 300 to analyze generated directed graphs, including historical directed graphs and current dynamic directed graphs, to identify sets of nodes that are similar or otherwise related (e.g., for the purpose of combining or collapsing those nodes into a super node), to identify flow patterns or characteristics of the directed graphs, to identify potential issues associated with malfeasance within the directed graphs, and the like. To accomplish these tasks, the network flow analysis application 360 may utilize data and information such as anomaly data 362, historical data 364, machine learning data 366, and graph pattern data 368.

The anomaly data 362 may comprise information from, or derived from, the node data 352, the edge data 354, and/or the timing data 356, flow characteristics of a generated directed graph of nodes and edges, historical characteristics of nodes and/or regions (e.g., subgroups of nodes and their respective edges) of directed graphs, and the like. The network flow analysis application 360 can utilize the anomaly data 362 to identify nodes (representing one or more accounts), edges (representing one or more transactions), or sets or groups of nodes and edges, that have characteristics (e.g., based on reputation, ownership, reputation values, confidence values, network flow trends, or the like) that are anomalous to another closely associated subgraph (e.g., nodes and edges within a degree of connectivity, nodes and edges within two degrees of connectivity, nodes with one or more similar characteristic, and the like). The anomalous determination may be based on an anomaly function for a particular subgraph that is based on account information, value information, confidence value information, historical information, flow characterization information, and the like. An information entropy value may be determined for the subgraph, and a divergence value can be determined for the subgraph as compared to one or more close subgraphs. The combination of these functions and calculations can be assessed as the anomaly value for the subgraph (node, or nodes and edges). The anomaly data 362 may additionally or alternatively be any information that indicates a network flow pattern that is anomalous to subgraph regions.

The historical data 364 may comprise historical malfeasance data, including nodal and edge patterns of a subgraph of a directed graph associated with a malfeasance along with the accounts and/or transactions associated with the malfeasance. The historical data 364 may also comprise historical account information, trends of accounts and transactions (represented as nodes and edges in the directed graph), historical patterns of interconnectivity among nodes and edges for a directed graph, and the like.

The machine learning data 366 may comprise information, rules, a knowledge base, and other information that is necessary for providing a useful input to a machine learning system (e.g., the machine learning system 120) to receive an output of an identification and/or value of an anomalous subgraph of a directed graph (e.g., a node or a set of nodes and edges), of confidence values for one or more edges of a directed graph, of reputation values of one or more nodes of a directed graph, of network flow characteristics (especially anomalous network flow characteristics) of a directed graph, or the like. The network flow analysis application 360 may be configured to perform at least a portion of a directed graph analysis based on the anomaly data 362, the historical data 364 and/or the graph pattern data 368, but may utilize a specialized machine learning system (e.g., the machine learning system 120) to perform one or more of the complex analyses described herein. In this way, the graph generation and analysis system 300 is able to focus its processing power on other tasks than running complex simulations, equations, or the like, and instead can transfer a specific set of data (i.e., at least a portion of the machine learning data 366) to a specialized machine learning system that is configured to provide an output of a particular analysis result or indication.

The graph pattern data 368 may comprise sets of known malfeasances (e.g., previously reported malfeasances and/or potential or expected malfeasances) and their associated patterns of interaction across a directed graph. This graph pattern data 368 may be stored in a searchable database that is easily accessible by the network flow analysis application 360 and/or a machine learning system (e.g., the machine learning system 120) for the comparison of nodal characteristics, edge characteristics, and/or network flow characteristics identified for a particular subgraph against the known patterns of nodal, edge, and/or network flow characteristics that are associated with particular malfeasances. In this way, the network flow analysis application 360 is able to determine a match between a current pattern of a subgraph of a dynamic directed graph against a known pattern of directed graphs that is associated with a particular malfeasance, which indicates that the current pattern of the subgraph likely is also associated with the particular malfeasance. As such, the graph generation and analysis system 300 can detect known malfeasance patterns from a global network representation (i.e., one or more directed and/or undirected graphs) of this data.

The network server application 340, the graph generation application 350, and the network flow analysis application 360 are configured to invoke or use the node data 352, the edge data 354, the timing data 356, the anomaly data 362, the historical data 364, the machine learning data 366, the graph pattern data 368 and the like when communicating through the network communication interface 310 with the managing entity system 200, the machine learning system 120, the computing device systems 400, and/or a third party system 130 to perform or execute one or more of the process steps described herein.

FIG. 4 provides a block diagram illustrating a computing device system 400 of FIG. 1 in more detail, in accordance with embodiments of the invention. It should be understood that any type of computing device system 400 may benefit from, employ, or otherwise be involved with embodiments of the present invention and, therefore, should not be taken to limit the scope of embodiments of the present invention. A non-exclusive list of the types of computing devices that may be a component of or comprise each computing device system include mobile phones, portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, point of sale devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of a wireless network (e.g., the network 150). In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 and/or a transaction application 421 (or any other application provided by the managing entity system 200). These applications also typically instructions to a graphical user interface (GUI) on the display 434 that allows the user 110 to interact with the computing device system 400, the managing entity system 200, and/or other devices or systems. In one embodiment of the invention, when the user 110 decides to enroll in the transaction application 421 program, the user 110 downloads, is assigned, or otherwise obtains the transaction application 421 from the managing entity system 200, or from a distinct application server (e.g., from a third party system 130). In other embodiments of the invention, the user 110 interacts with the managing entity system 200 or the directed graph and analysis system 300 via the web browser application 422 in addition to, or instead of, the transaction application 421.

The memory 420 of the computing device system 400 may comprise a Short Message Service (SMS) application 423 configured to send, receive, and store data, information, communications, alerts, and the like via a wireless network.

The transaction application 421 may comprise a user portal to the transaction application 250 established and managed by the managing entity system 200. As such, the transaction application 421 may be configured to facilitate at least a portion of a transaction (e.g., a transfer of funds, a transfer of information, or a combination of the two) from an account (e.g., financial account, or the like) of a first user to an account of a second user. The transaction application 421 may include a communication application from which a user can communicate with another user to the transaction and/or with an agent of the managing entity. In some embodiments, a user may initiate or otherwise be engaged in a transaction with another user via the transaction application 421. The user may have input a transaction amount and provided instructions or a request to transfer the transaction amount to an account of a second user (e.g., by inputting an account number of the second user, by selecting or entering a user and/or account identification number or name, or the like). The managing entity system 200 may then interact with the user by transmitting instructions to the transaction application 421, causing the computing device system 400 to present certain information, authorization credential requests, alerts, or the like, on the user interface 430.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein. For example, the memory 420 may include such data as transaction data, device identification data, user data for a user associated with the computing device system 400, and the like.

Referring now to FIG. 5, a flowchart is provided to illustrate one embodiment of a process 500 for generating dynamic directed and undirected graphs and determining reputation values, confidence values, and network flow anomaly functions, in accordance with embodiments of the invention. In general, this process 500 receives or extracts transaction information for a plurality of accounts over some period of time (e.g., of all time, over the past 20 years, over the past 10 years, over the past year, over the past week, over the past hour, and/or the like), and converts this information into a network of nodes and edges (i.e., a directed graph, an undirected graph, a hybrid of a directed and undirected graph, and the like) that represent the accounts and transactions between the accounts, respectively. Each directed and/or undirected graph of nodes and edges (e.g., as a whole directed or undirected graph, as one or more subgraph sets of nodes and edges, as an individual node, as an individual edge, or the like) can then be analyzed (e.g., compared to the same or similar nodes and edges over time, to nodes or edges that are expected to have similar characteristics, to known nodal patterns, or the like) to identify anomalies, flow characteristics, and nodal or graph patterns that are indicative of malfeasance or potential malfeasance. By identifying these incidences of potential malfeasance quickly (e.g., in real-time, in near real-time, and the like) through one or more of the remediation steps described in the subsequent processes described herein.

As such, the process 500 may include block 502, where the system receives transaction information for a plurality of accounts including, for each transaction, transaction amounts, transaction times, payor financial accounts, and payee financial accounts. Of course, other transaction information may be obtained (e.g., received or extracted from one or more databases of account information, user information, transaction information, timing information, and the like). For example, the transaction information may additionally or alternatively include information about how long each account has been open, timing between transactions (e.g., transaction frequencies), reputation values for accounts or users associated with accounts, duration of time that two accounts have been making transactions between each other (i.e., duration of a connection between accounts), historical transaction information, account balance histories, reports of malfeasance or potential malfeasance for one or more of the accounts and/or transactions, transaction types, goods or services associated with each transaction, types of accounts, type of computing device(s) associated with each transaction, computing device confidence values, type or level of authentication on each computing device associated with executing each transaction, financial institution information for each account and/or transaction, recovery potential for each transaction, or the like.

This transaction information may be gathered or otherwise sourced from internal databases of a managing entity (e.g., a financial institution, a peer-to-peer transaction application management system, or the like), and/or may be collected from one or more entities that have an agreement to provide the transaction information to a managing entity (e.g., a consortium of financial institutions that participate in or manage a common transaction application for customers of the financial institutions). In this way, the system is able to collect account information and individual transaction information from any entity that has access to the information so that the system receives all or substantially all account and transaction information for a particular transaction application. In some embodiments, the system may additionally collect transaction and/or account information for a plurality of other transaction applications (e.g., fund transfers between accounts of a single financial institution, withdrawals from accounts of a financial institution, deposits of funds to an account of a financial institution, credit card transactions, peer-to-peer transactions, financing transactions, and the like). As transaction data, account information, non-monetary transaction information, and the like updates or changes over time, the system may be configured to monitor existing transaction and account data, monitor transaction and account data inputs, and/or actively access databases (e.g., third party databases) that update in real time or near real time to identify new transaction or account data or changes to existing transaction or account data.

This transaction information for each of the plurality of accounts and transactions can be stored in a database that is accessible by a managing entity system (e.g., the managing entity system 200), a graph generation and analysis system (e.g., the graph generation and analysis system 300), a specialized machine learning system (e.g., the machine learning system 120), or a third party system (e.g., the third party system 130).

In some embodiments, the process 500 includes block 504, where the system generates dynamic directed and undirected graphs, where each graph comprises a plurality of nodes and a plurality of edges, where each of the plurality of nodes is associated with at least one of the plurality of financial accounts, and where each of the plurality of edges is associated with at least a net transfer amount and a net transfer direction between two of the plurality of nodes. Each of the generated directed and undirected graphs may represent all transaction information (including the account information) for a total period of time that the transaction information has been collected. Additionally or alternatively, the generated graphs may represent all transaction information over a specific time period (e.g., over the past five years, over the past year, over the past month, over the past day, for a specific year of time or set of years, for a specific period of time that a particular account was or is active, or the like). In some embodiments, because the generated directed and/or undirected graph is based on transaction information that spans a large amount of time, a generated directed or undirected graph may be dynamically adjusted by a user to only represent a specific time period. Additionally or alternatively, in embodiments where the time period for a generated directed or undirected graph includes current or very recent transactions, each directed and/or undirected graph may continuously update as new transactions are proposed, initiated, and/or executed, thereby dynamically changing over time to provide a current representation of a network of accounts and their transaction interactions.

As noted above, each node of a directed or undirected graph represents at least an account (e.g., a financial account, or the like). Therefore, in some embodiments, each node represents a single financial account. However, because some users own, manage, or are otherwise associated with multiple accounts, multiple related accounts may be grouped together into a single node (sometimes referred to herein as a "super node") that represents the account information and transaction information of a single entity (or a grouping of related entities).

The edges of each directed or undirected graph generally represent the transactions between each of the nodes (i.e., accounts) in the directed or undirected graphs. The edges may be presented in a plurality of different ways. For example, there may be a single edge between a first node and a second node, where the single edge represents an aggregation of all transactions between the first and second nodes. In this way, the system may calculate all transactions from the first node to the second node, reduce the calculated amount by a calculation of all transactions from the second node to the first node, and assign the single edge with the resulting aggregate transaction amount and direction. In this way, if the aggregation of transactions between the first and second nodes results in a net transaction amount from the first node to the second node, then the single edge will comprise a vector from the first node to the second node with an amount of the net transaction amount. If, on the other hand, the aggregation of transactions results in a net transaction amount from the second node to the first node, then the single edge will comprise a vector from the second node to the first node with an amount of the net transaction amount.

In other embodiments, each edge of a directed graph may represent a single transaction. Therefore, if there are three transactions from a first node to a second node, and a single transaction back from the second node to the first node, then all four transactions will be included in the directed graph, with three edges comprising vectors of the respective transaction amounts of the three transactions from the first node to the second node, and the fourth edge comprising a single vector of the single transaction back from the second node to the first node.

In yet another embodiment, each edge may represent a collection of all transactions between each pairing of nodes. Using the example above, if there are three transactions from a first node to a second node, and a single transaction back from the second node to the first node, then a single edge between the nodes will be provided, where the edge is presented as bi-directional between the nodes. This bi-directional edge indicates that transactions occur in both directions (i.e., from the first node to the second node, and from the second node to the first node). This bi-directional edge will also include the transaction information for all four transactions that the bi-directional edge represents, including an aggregate transaction amount, and information about each transaction between these two nodes (including, but not limited to, individual transaction amounts, transaction times, purposes of the individual transactions, additional information (e.g., messages, goods or services, authentication data, notary data, and the like) associated with each individual transaction, and the like). In this way, the directed graph illustrates the fact that transactions occur both ways between the two nodes while also storing important information about each individual transaction between the two nodes and aggregate or net transaction information between the nodes.

Once the dynamic directed and undirected graphs have been generated, one or more of the graphs can be presented on a computing device (e.g., a workstation, a personal computing device, a laptop, or the like) of a specialist (e.g., a user 110) of a managing entity, where the specialist is specifically trained in the identification of malfeasance detection within a network of nodes and edges that represent accounts and transactions, respectively. This presentation may include a display of at least a portion of the one or more directed or undirected graphs as a nodal network of the generated nodes and edges, where each node includes an identification code or name that can be utilized by the specialist to identify the account (or multiple accounts) represented by each node. Additionally, the display of the edges may also include a reference code or name for each edge that the specialist can utilize to access the information about the transactions represented by that edge. In some embodiments, the display of the nodes and/or edges may include selectable links such that information about the node(s) and/or edge(s) can be immediately accessed by the specialist in response to the specialist selecting the node(s) and/or edge(s) within the displayed directed and/or undirected graphs.

In some embodiments, the displayed directed or undirected graph includes functionality to display only a set of associated nodes and edges in response to the specialist selecting a node or group of nodes. For example, a specialist may select a first node with an indication that the specialist would like to identify all nodes and associated edges that interact directly or indirectly with the selected node. The system may then display a subgraph of the directed or undirected graph to illustrate all nodes that receive transactions directly from the first node, all nodes that receive transactions indirectly from the first node (e.g., all nodes that indirectly receive transactions of funds through two degrees of separation from the first node, within three degrees of separation from the first node, or the like).

Additionally or alternatively, the system may, in response to the user selecting the first node with an indication that the specialist would like to identify nodes (and associated edges) that provide transactions to the first node, display a subgraph of the directed or undirected graph that includes all nodes that provide transactions to the first node, either directly or indirectly through two degrees of separation, three degrees of separation, or the like.

In this way, the system is able to identify and/or display subgraphs or subsets of nodes and edges that are linked to a particular node within the directed or undirected graph. From this information, the system is able to make certain anomaly determinations, network flow pattern determinations, confidence value determinations, reputation value determinations, and other determinations as to a likelihood of an occurrence of a malfeasance associated with one or more accounts of the subgraphs. While the selection of a particular node by a specialist is described above, it should be known that the system may automatically identify a specific node or set of nodes to analyze based on reputation values for those nodes, confidence values for edges associated with those nodes, ownership information for the accounts represented by the nodes, network flow characteristics associated with the nodes, and the like.

Once the total directed and undirected graphs have been generated, the system can analyze user characteristics, account characteristics, flow patterns, transaction patterns, relationship information, and other malfeasance metrics for individual nodes (and the represented account(s)), individual edges (and the represented transaction(s)), and subgroups (or sets) of nodes and edges. Therefore, for each transaction in the directed and undirected graphs, the system can analyze information about who a payor entity is, who a payee entity is, how the payor and payee entities are connected, a confidence value associated with potential malfeasance for the transaction, and other details about each individual transfer, as represented between two nodes and a connecting edge.

In some embodiments, the process 500 includes block 506, where the system determines reputation values for each node of the dynamic directed and undirected graphs. This reputation value may be a numerical value, a ranking of a plurality of reputation values, a labeling of a reputation characteristics based on a determined reputation value, or the like. The reputation value for a node may be based at least partially on a transaction history for the account(s) associated with that node. For instance, if a node is associated with a single account that has a long history of transactions and no reported or suspected malfeasances, then the system can assign or designate the transaction history element of the reputation value determination with a value that is indicative of a low likelihood of malfeasance. Alternatively, a node that is associated with a relatively new account (e.g., an account that is a few days old, a few hours old or the like), and/or one or more instances of reported malfeasance or suspected malfeasance, may be assigned or designated with a transaction history element of the reputation value determination that is indicative of a high likelihood of malfeasance.

The system can create custom tables or databases of users and/or accounts associated with malfeasance (or a strong likelihood of malfeasance) that should not receive transactions, or from which transactions should not be accepted from. This table may be dynamically updated over time as new users, entities, and accounts are identified, as new malfeasance reports are received, as historical malfeasance instances have been rectified or remediated, and the like.

Additionally or alternatively, the reputation value determination for a node may be at least partially based on one or more characteristics of the entity or entities associated with the node. These entities may be one or more owners of the account associated with the node, a financial institution that manages the account associated with the node, a beneficiary of the account associated with the node, a trustee of the account associated with the node, or the like. The characteristics of the entity may include, but are not limited to, a physical location of the entity, a residential or business address of the entity, a line of business of the entity, a history of malfeasance reports associated with the entity, a duration of time that the entity has been associated with (e.g., a customer of) the managing entity that controls the transaction application or the financial institution that manages the account of the entity, or the like.

Furthermore, the system may determine a flow characteristics, or a flow characterization for each node, from which the reputation value can be at least partially determined. The flow characteristics or flow characterizations comprise information about the amounts of funds that are transferred to and/or from accounts associated with the node, the frequency or velocity of such transfers to and/or from the node, and trends associated with the amounts and frequencies or velocities of such transfers. A node that has had a change in the flow characteristics or flow characterization of the node over a period of time (e.g., a change from a generally neutral flow where the amount received is similar to the amount transferred out to a directional flow where the amount received is significantly different than the amount transferred out) will be assigned a flow characteristic or flow characterization value and weighting that will cause the overall reputation value of the node to move towards a value more closely associated with a likelihood of malfeasance.

The process 500 may also include block 508, where the system determines confidence values for each edge of the dynamic directed and undirected graphs. As used herein, a "confidence value" is an indication as to whether a potential transaction likely is associated with malfeasance or not. The determination of the confidence value can be based on a plurality of underlying malfeasance metrics. These malfeasance metrics may comprise criteria, features, statistics, transaction information, historical account information, historical transaction information, reporting information, and the like that are associated with one or more nodes or edges of a dynamic graph. Therefore, a first item in the hierarchy of characteristics considered or analyzed by the system may comprise a historical characterization of the payor account (e.g., associated with a first node) and the payee account (e.g., associated with a second node). For example, if both accounts have been active for a long period of time (e.g., several years), then this is an indication that malfeasance is unlikely to be occurring between the accounts. However, if one of the accounts is very new (e.g., a few days, a few hours, a few minutes, or the like), then this may be an indication that a potential malfeasance could be associated with a transaction between these accounts.

Additionally or alternatively, the historical information may include a determination about the connectivity (e.g., previous interactions or transaction) between the two accounts. For example, the system may analyze historical transaction data for the accounts to determine whether previous transactions between these accounts has occurred (indicative of a low probability of malfeasance for a current or most recent transaction between the accounts), and whether a similar transaction has occurred between the accounts (indicative of a high probability that malfeasance is not occurring in a current or most recent transaction between the accounts). In this way, the system may be able to clear some transactions based on a known history of the two accounts performing similar transactions (e.g., transactions occurring at the same time of the month, for roughly the same amount, for the same or similar purposes, for similar goods or services, or the like). Alternatively, if no previous transactions have occurred, or if previous transactions between these accounts was for a very different purpose and those transactions occurred several years ago, then the system can adjust the custom confidence value for a current or most recent transaction between the accounts.

Furthermore, the historical information may include a duration of time that the accounts have had a history of interacting or otherwise communicating between themselves. For example, a continuous (e.g., weekly, monthly, annually, or the like) period of time that the accounts have been interacting may be indicative of likelihood that a current or recent transaction between the accounts is not malfeasant. However, a determination that the accounts have only been transacting or communicating between themselves for a few days may be indicative of a potential malfeasance.

The historical information may include a number of previous transactions that have occurred between the two accounts. Here, the higher the number of previous transactions between the accounts, the more likely that a current or recent transaction is not associated with malfeasance. Similarly, the historical information may include a frequency of previous transactions between the accounts, where the likelihood of a current or recent transaction being associated with a malfeasance decreases as the frequency of previous transactions increases.

The custom confidence value may additionally or alternatively be determined based on a reported malfeasance history for one or both of the accounts represented by the two nodes and the edge(s) between the nodes. The reported malfeasance history may include previously reported malfeasant transactions by one or both of the accounts (including transactions by one of the accounts to a separate account (e.g., a third account)). Of course, a report of a malfeasant transaction by one of these accounts may cause the custom confidence value to move towards likelihood of malfeasance for a current or recent transaction. Additionally, the presence of multiple reports of malfeasant (or potential malfeasant) transactions for one or both of the accounts would more heavily weight a confidence value of the associated node towards a value associated with a high likelihood of malfeasance.

In some embodiments, a malfeasant transaction may not have been reported, but historical transaction data for one or both of the accounts associated with the two nodes may be associated with patterns and/or characteristics that are common in malfeasant transactions. In such cases, the system may determine that those accounts are associated with a higher likelihood of malfeasance in recent, current, and/or future transactions as well. In some embodiments, the weight of a recorded malfeasant transaction for an account (represented by a node) may decrease over time (e.g., linearly, exponentially, logarithmically, or the like).

The confidence value for an edge (or transaction) between two nodes can additionally or alternatively be based on a level of connectivity between the two nodes. For example, if the two nodes are owned by or associated with individual users that are related, are connected via a social media network by one or two degrees of connection, have physical residential or work addresses that are close to each other (e.g., within a predetermined distance from each other, within a same zip code, within adjacent or nearly adjacent zip codes, within a same county, within a same country, or the like), or other indicators that the two individuals or entities associated with the edge (i.e., transaction(s)) are related in some manner, then the system may adjust the custom confidence value to be more closely associated with a transaction that is not associated with malfeasance. On the other hand, if the individuals or entities associated with the edge or transaction are not found to be related in any manner (e.g., not related by family, not connected by work, residing in different countries, none or minimal social media connections, or the like), then the system can adjust the confidence value for the transaction represented by the edge to be more associated with a potential malfeasance.

Furthermore, the confidence value for an edge representing a transaction may be based at least in part on an amount of transaction exposure. The transaction exposure may include or be associated with a type of transaction, a transaction amount, a device transaction frequency or velocity, or the like. The type of transaction may be compared to a database of known types of transactions and their respective likelihood of being associated with a malfeasant transaction to determine a weighting of how likely the current or recent transaction (represented by the edge) is to be associated with a malfeasance. The transaction amount may similarly be compared to a database of known transaction amounts or transaction amount ranges and their respective likelihoods of being associated with a malfeasant transaction to determine the weighting of how likely the current or recent transaction (represented by the edge) is to be associated with a malfeasance. Likewise, the system may compare the type of transaction device being utilized to initiate, authorize, execute, and/or approve the transaction to a database of known transaction device types and their associated likelihoods of being associated with a malfeasance to determine the weighting of how likely the current or recent transaction is to be associated with a malfeasance. The transaction frequency or velocity (i.e., how often and how quickly transactions are being requested and/or executed by one or both of the accounts associated with the two nodes) may be compared to historical transaction frequencies or velocities to identify whether the current transaction frequency or velocity is similar or significantly different from the historical transaction frequencies or velocities. Of course, a node associated with one or more accounts that historically have transferred funds a first amount on a bi-weekly basis, but is now requesting transactions for the transfer of a second amount of funds that is much greater than the first amount, multiple times a day, would cause the system to adjust the transaction exposure value of the confidence value to be more associated with a potential malfeasance.

The confidence value for an edge (and its associated current or recent transaction(s)) may additionally or alternatively be determined based on account or account device characteristics of one or both of the nodes associated with the edge. To determine the account or account device characteristics, the system may identify how an individual accessed an account associated with one of the nodes. If the individual accessed the account on a jail-broken phone, on a new phone, on a device that has at least one historical report of malfeasance, on a device that is associated with a higher-than normal probability of malfeasance, or the like, then the system can assign an account or account device characteristic value and weighting indicative of potential malfeasance, which would cause the confidence value for the edge to be more associated with a potential malfeasance. However, the account(s) was accessed by a single device that is known by the managing entity system to be associated with an individual user that owns or manages the that account, then the system can assign an account or account device characteristic value that is indicative of a low likelihood of malfeasance, which causes the confidence value of the edge to be less associated with potential malfeasance. Other account or account device characteristics that the system can take into consideration may include, but are not limited to, an account balance, a historical account balance, a trend of the account balance, Finally, the system may analyze the accounts associated with the edge for which the confidence value is being determined to identify a recoverability exposure amount. Each transaction or payment is ranked based on the amount that is exposed for the managing entity (e.g., the financial institution overseeing the transfer), based on regulations and recoverability potential for the transaction. For example, a transaction (represented by the edge) between two accounts (represented by the nodes) that are with the same financial institution that is executing the transaction will have a high likelihood of recoverability (or a low recoverability exposure amount). Alternatively, a transaction that involves an account that is not associated with the managing entity of the transaction, and where that account is associated with a financial institution that is not in a close working relationship with the managing entity of the transaction or another financial institution that manages the other account to the transaction, will be associated with a high recoverability exposure because it would be much more difficult to recover a transaction amount from this non-managed or non-related financial institution. The amount of the transaction will also weight the recoverability exposure amount because a small transaction to an account that is not managed by the managing entity for the transaction has a lower recoverability exposure than a large transaction.

Ultimately, the managing entity system can determine an overall confidence value for an edge (or sets of edges) between two nodes (representing accounts). This confidence value can then be compared against a database or table of confidence values and associated potentials for malfeasance to determine the potential for malfeasance associated with this specific confidence value of the analyzed edge. This determination can be conducted for each edge in the directed and undirected graphs, or can be conducted for edges in a specific subgraph that the system and/or a specialist would like to analyze closely. In some embodiments, the confidence value for each edge can be displayed next to each edge (e.g., as a numerical value of the confidence value, as a percentage of likelihood of malfeasance, or the like). Additionally or alternatively, the displayed edge itself may be color coded, bolded, dotted, or the like to indicate the confidence value or to indicate that the confidence value is within a particular range (e.g., a green edge line would be displayed for an edge with a confidence value that is not associated with potential malfeasance, a yellow edge line would be displayed for an edge with a confidence value that is slightly associated with a potential malfeasance (e.g., within a particular range of confidence values), and a red edge line could be displayed for an edge with a confidence value that is associated with a high likelihood of potential malfeasance (e.g., a value above or below a predetermined threshold value)). Of course, the color coded edge embodiment may use other colors, include more than the three ranges of colors and confidence value ranges, and the like.

Finally, in some embodiments, the process 500 includes block 510, where the system determines a flow anomaly function based at least in part on the reputation values for each node of the dynamic directed graphs and the confidence values for each edge of the dynamic directed graphs. The flow anomaly function can be determined for each node in the directed graph and/or for a subgraph (e.g., a smaller set) of nodes within a directed graph. The flow anomaly function is determined based on the characteristics of both the edges associated with the node(s) being analyzed and the node(s) being analyzed itself.

The system may calculate an information entropy (e.g., based on a Shannon entropy value) for the node(s) being analyzed. The system may also calculate an amount of divergence from a closest subgraph of the analyzed graph (e.g., nodes within one degree of separation of the node(s) being analyzed, nodes within two degrees of separation of the node(s) being analyzed, or the like). The divergence value is larger for nodes that have characteristics that are dissimilar to the average or mean characteristics of the other nodes in the closest subgraph, and the amount of difference may be based on a standard deviation from the mean, or any other predetermined function. The system may then determine or calculate a combined flow anomaly value, based on the flow anomaly function, which is a combination of the information entropy and the divergence value for the node(s) being analyzed.

While the determination of the anomaly function is described as being determined based on both reputation values of nodes and confidence values of edges, it should be known that in some embodiments the anomaly function is determined based solely on characteristics and information about a set of nodes, based solely on characteristics and information about a set of edges, or a combination of some nodes and some edges in a subgraph or other set of nodes and edges of the overall graph.

In some embodiments, the system may utilize a machine learning system (e.g., the machine learning system 120 of FIG. 1) to detect flow patterns within the directed graph (e.g., for a set of nodes within the overall directed graph). The system and/or the machine learning system may identify flow patterns by matching identified flow patterns across nodes in a directed graph to Kirchoff's Current Law. Flow patterns for subgraphs that are associated with fixed collaborative patterns (e.g., high directional flow similar to the patterns illustrated in FIG. 8 or FIG. 9) can thereby be identified as potentially being associated with a malfeasance.

The system may, in some embodiments, calculate a source for each node in the directed graphs (or within a subgraph or smaller set of nodes of a directed graph), to determine a likelihood that a particular node is a "source" to the network of nodes represented in the directed graphs (or to the subgraph or smaller set of nodes of a directed graph). A source node may comprise a node where an anomalous amount of funds originate for a particular subgraph (or for the overall directed graph). For example, a source node may comprise a node that is associated with one or more accounts where large deposits are made and frequent and/or large transfers of funds are made out of these source accounts to one or more other accounts (i.e., a high directional flow from the source node to other nodes associated with the one or more other accounts). These funds may then be tracked by analyzing the flow of the nodes to which the source node transferred funds, across a directed graph or a subgraph of the directed graph to identify other nodes that are affected by (e.g., funded, interact with, or the like) the identified source node. All of this information about the flow of the identified (e.g., potential) source node, the interactions with nodes that receive transactions from the identified source node, other nodes in a subgraph or an overall directed graph that likely are affected by the source of funds that enters the directed graph from the source node, and the like, are analyzed to determine a source characterization that indicates a likelihood that a node is a source node and/or a rating of node as a source when compared to similar or nearby nodes.

While the presence of a source node does not by itself raise red flags regarding potential malfeasance, the presence of one or more other nodes that appear to be recouping a significant portion of the funds that originate from the source node would trigger an alert of a potential malfeasance. As such, the system may determine sink characterizations for the plurality of nodes within a directed graph or a subgraph (e.g., a subgraph of nodes that appear to be affected by a source node).

The sink characterization for each node may be determined based on a flow characterization that is indicative of the reception of a large amount of funds but little to no transfers to other nodes. For example, a node associated with an account that receives transactions of funds from one or more other accounts, and then a majority of those funds are withdrawn from the account instead of being transferred to other accounts, would be considered a sink node because the funds "sink" to that node and leave the directed graph's nodal network.

When the system's analysis of the custom entropy and divergence values for a set of nodes (e.g., an overall directed graph or a subgraph of the overall directed graph) identifies one or more source nodes as well as one or more sink nodes for that set of nodes, the system can characterize or otherwise designate the set of nodes as potentially being associated with an anomalous directional flow that may be related to or a part of a malfeasance. Such an anomalous directional flow indicates that funds are entering a particular set of nodes (e.g., subgraph) at a source node, is transferred across a network of multiple nodes (e.g., intermediary nodes), and exits the set of nodes at one or more sink nodes. This type of subgraph network flow is indicative of schemes to hide, conceal, or otherwise obfuscate the origin of the transferred funds by executing multiple transactions (e.g., which may be in exchange for goods or services, or alleged to be for the goods or services) between multiple accounts. An example of this type of anomalous node network is illustrated in FIG. 8.

When the system's analysis of the custom entropy and divergence values for a set of nodes (e.g., the overall directed graph or a subgraph of the overall directed graph) identifies one or more sink nodes that is/are receiving transactions from a plurality of other nodes in that set of nodes, the system may analyze these sink nodes to determine whether the network flow characteristics of those nodes is anomalous or not. For example, if the system determines that these nodes have a longstanding history (e.g., multiple months, multiple years, or the like) of receiving many transactions and removing the funds from those accounts without any or many reports of malfeasance, then the system may determine that the sink node(s) is not anomalous. On the other hand, if the system determines that the identified sink node(s) is associated with a relatively new account (e.g., an account that was opened or first active for only a few hours, for a few days, or the like), of if the system determines that the identified sink node(s) is associated with an account that has recently changed from being relatively flow-neutral (i.e., not having the characteristics of a sink node) to having sink-like characteristics, then the system may determine that the flow anomaly function is associated with a malfeasance. For example, a node with this type of anomalous flow function (i.e., a sink-function) and nodal and/or flow characteristics (e.g., being associated with an account with a short active period or a recent change from flow-neutral to sink flow behavior) may be associated with a scheme to receive funds from multiple other accounts and extract the funds and close the account without providing any promised goods or services. An example of this type of anomalous node network is illustrated in FIG. 9.

As noted above, FIG. 6 provides a sample embodiment of a dynamic directed graph 600, in accordance with an embodiment of the invention. In some embodiments, this representation of the directed graph 600 may comprise a subgraph or other set of nodes that is a component of a larger directed graph. A plurality of nodes 602 (i.e., nodes ei, ej, e1, e2, e3, e4, e5, and e6) are displayed in the directed graph. As described in more detail above, each node 602 may represent one or more accounts (e.g., financial accounts, accounts associated with a single individual or entity, accounts associated with a single identification characteristic like a user name, or the like). As such, the displayed directed graph 600 illustrates a spatial presence of the plurality of accounts through the nodal representations.

Additionally, as described above, a plurality of edges 604 are included in the directed graph 600 to represent transactions, communications, interactions, or other connections between certain pairs of nodes 602. Some of the edges 604 shown in FIG. 6 represent how transactions are transferred in a single direction. For example, edge 606 illustrates that all transactions between node ei and node e1 are from the account(s) associated with node ei to the account(s) associated with node ej. Likewise, edge 608 illustrates that transactions occur in both directions between the account(s) associated with node e1 and the account(s) associated with node e3.

Of course, the system may store additional information about the edges 604, including, but not limited to, a total number of transactions between accounts associated with the paired nodes 602, total numbers of transactions occurring in each direction between the accounts associated with the paired nodes 602, individual transaction amounts between the accounts associated with the paired nodes 602, aggregate transaction amounts between the accounts associated with the paired nodes 602, transaction trends between the accounts associated with the paired nodes 602, and the like.

Some of this additional information can be illustrated in some embodiments of display of the directed graph 600. For example, the system may display high-volume interactions as edges 604 with thicker line width than other edges 604 with low volumes of transactions. As another example, a distance between two nodes 602 (and therefore a distance of the respective edge 604) may be indicative of a frequency and/or amount of transactions between the accounts associated with the paired nodes 602, where shorter edges 604 are associated with higher frequencies of transactions and/or large transaction amounts.

Furthermore, additional directional information may be provided for edges 604 that are bidirectional. Using edge 608 as an example, if the aggregate amount of funds transferred to the account(s) associated with edge e3 are significantly greater (e.g., twenty-five percent greater, greater by an order of magnitude, or the like) than the aggregate amount of funds transferred to account(s) associated with edge e1, then the arrow 608a of the edge 608 pointing toward node e3 may be displayed as a larger (e.g., longer, wider, bolder, or the like) arrow than the arrow 608b pointing toward node e1. In another embodiment, the edge 608 itself may be tapered such that the line width of the edge 608 is greater towards the arrow 608a than the arrow 608b, providing a visual indication that while transactions occur in both directions, a majority of the transactions (e.g., by frequency and/or total amount) are in the direction of the accounts associated with node e3.

Because confidence values for each of the edges 604 have been determined by the system, the system may display the edges 604 with color coding to provide a visual representation of the confidence values of the edges 604. For example, edges 604 with confidence values associated with likely malfeasance may be colored red, edges 604 with confidence values associated with potential malfeasance may be colored yellow, and edges 604 with confidence values associated with an unlikely potential for malfeasance can be colored green.

The nodes 602 themselves can be displayed in a manner that conveys additional information about the network represented by the directed graph 600, which may enable a specialist of a managing entity to better understand characteristics of accounts associated with the nodes 602, interactions between those accounts, and identify and initiate procedures to mitigate potential malfeasance issues. Because the system has determined reputation values for these nodes 602, the system may color code each of the nodes 602 based on their respective reputation value. For example, nodes 602 with reputation values associated with likely malfeasance may be colored red, nodes 602 with reputation values associated with potential malfeasance may be colored yellow, and nodes 602 with reputation values associated with an unlikelihood of malfeasance may be colored green.

Because a flow anomaly function has been determined for certain nodes 602, pairs of nodes 602 and connecting edges 604, and/or for subgraphs or other smaller sets of the directed graph 600, the system may adjust the displayed directed graph 600 in a manner that conveys the flow anomaly function(s) for the directed graph. For example, the system may display a shadow (e.g. the shadow 705 shown in FIG. 7B) around a particular node 602 that is associated with a flow anomaly function that is associated with a strong divergence from surrounding nodes 602. Similarly, if the system has identified multiple nodes 602 that have a flow anomaly function that is associated with a divergence from the surrounding nodes 602, then the system may display a shadow around those nodes 602 and the edges 604 that connect those nodes 602.

The directed graph 600 can be displayed as a static representation of nodes 602 and edges 604 associated with accounts and their interactions, respectively, for a particular point in time. In other embodiments, the directed graph 600 can be displayed as a dynamic representation of the nodes 602 and edges 604 associated with accounts and their interactions, respectively, in real-time, and may continuously update as new accounts are opened (e.g., by adding new nodes 602), as current accounts close, as transactions occur (e.g., by adding new edges 604 or by adjusting data and/or the display of current edges 604), and the like.

In some embodiments, the system may permit a user (e.g., a user 110, a specialist, and/or the like) to adjust a time for the displayed directed graph 600, which permits the user to dynamically adjust the directed graph 600 to display its structure, configuration, connections, recent transactions, and the like, over different periods of time.

While a directed graph 600 is displayed and described with respect to FIG. 6, it should be known that, in some embodiments, the generated graph may be undirected such that the association between each node 602 is represented by an edge (similar to the edges 604) to indicate the relationship or other association between two nodes, but these edges are not directional. Similarly, the generated graph may comprise a mixed graph that includes both directional and non-directional edges. For example, a first node may have conducted a transaction with a first node, and therefore a first edge is directionally associated with a flow of funds that transferred during the transaction. Additionally, the first node may be determined to be closely associated with a third node (e.g., through familial relation, through social media relation, through a business relation, or the like) without a transaction occurring between these nodes. As such, a non-directional edge may be displayed between the first and third nodes represent to represent the relationship, even though no transactions have occurred in the past.

Referring now to FIG. 7A, a flowchart is provided to illustrate one embodiment of a process 700*a* for collapsing multiple nodes of a dynamic directed graph into a single super node of the dynamic directed graph, in accordance with embodiments of the invention. The purpose of implementing this collapsing process 700*a* is to identify scenarios where a single entity is controlling multiple nodes in a manner indicative of achieving a common objective, such that these multiple nodes should be viewed as a single node (i.e., a combined super node) to gain a better understanding of the nodal and flow characteristics of the network represented by the directed graph.

As such, the process 700*a* may include block 702, where the system generates a dynamic directed graph comprising a plurality of nodes and a plurality of edges, where each of the plurality of nodes is associated with a plurality of financial accounts, and where each of the plurality of edges is associated with at least a net transfer amount and a net transfer direction between two of the plurality of nodes. This dynamic directed graph may be generated in the same manner, and using the same data, information, interaction information, and the like, as described with respect to block 504 of FIG. 5.

A sample subgraph 700*b* of a plurality of nodes that have been generated as part of a dynamic directed graph is provided in FIG. 7B. The sample subgraph 700*b* includes nodes 701 and edges 703. The analysis associated with the process 700*a* will begin with a focus on node ei, where certain characteristics have been identified for that node 701, as represented by the shading 705. These characteristics may comprise user, entity, and/or account information for the account(s) associated with the node ei, transaction history information for the account(s) associated with the node ei, and the like.

As shown in subgraph 700*b*, the node ei has a bi-directional connection (i.e., transactions occur in both directions) with node e3 and node e1. Additionally, the connection of node ei to node e2 is mono-directional, in that transactions are only occurring from the account(s) of node ei to the account(s) of node e2. Similarly, the connection of node e1 to node e2 is also mono-directional, in that transactions are only occurring from the account(s) of the node e1 to the account(s) of node e2.

Moving to block 704 of FIG. 7A, the process 700*a* may proceed with the system determining that two or more of the plurality of nodes are highly interconnected within the dynamic directed graph. A sample subgraph 700*c* of the plurality of nodes of FIG. 7B, where two nodes (i.e., node ei and node e1) are identified as being highly interconnected is provided in FIG. 7C. The interconnectivity is illustrated with the additional shading 707 of node ei in this FIG. 7C.

The determination of interconnectivity for a pair of nodes may be based on a plurality of factors. In some embodiments, these factors include common account information which may include, but is not limited to, a common individual account owner, a common institutional account owner, a common entity that manages the accounts, related account owners, geographically similar owners of the accounts, similar or identical account types, common or similar dates that the accounts were opened, or the like. Transaction histories, both between the potentially related nodes and with other nodes, may additionally or alternatively analyzed to determine a level of interconnectivity between a pair of nodes. For example, nodes that make similar transactions to a third party node, nodes that receive a transfer from the other node and then transfer that same amount (or an amount within a predetermined percentage of the original amount) to a third party node on a regular basis, nodes that receive transactions from the same or similar third party nodes, and the like are all indicative of nodes that likely have a high interconnectivity. The higher the interconnectivity, the more likely that these nodes (and the underlying accounts that are represented by the nodes) will continue to act in an identical, highly similar, or in a coordinated manner, and therefore should be considered a single node for the purpose of better understanding the spatial network of accounts represented by the nodes and their interactions with other nodes that are not highly interconnected.

As such, in some embodiments, the process 700*a* of FIG. 7A includes block 706, where the system collapses the two or more of the plurality of nodes into a single super node within the dynamic directed graph. A sample representation of a subgraph 700*d* of the plurality of nodes of FIGS. 7B and 7C, with a combined set of nodes into a super node ei1, highlighted by the shadow 709, is provided in FIG. 7D. This super node ei1 represents a combination of the node ei and the node e1 from FIG. 7B and FIG. 7C. In this example, it was determined that node e1 merely acted as an extension of node ei, because node e1 received transactions from node ei and either passed those transaction amounts on to node e2 (the only other node 701 that node ei transferred funds to) or returned at least a portion of the transactions back to node ei. This trait was enough to determine that the nodes likely are highly interconnected, even if the account(s) associated with node ei and node e1 are not (on paper) owned by the same individual or entity, although common ownership would provide additional support for determining that these nodes ei and e1 are highly interconnected.

The resulting super node ei1 now encompasses all accounts from both node ei and node e1, and the transactions from both node ei and node e1 to node e2 are now represented as a single edge 711.

Once node ei and node e1 have been collapsed into the super node ei1, the system may run calculations and make determinations on reputation values, confidence vales, and anomalous flow functions for the overall directed graph and/or the subgraph associated with the new super node ei1. As the underlying nodes ei and e1 have their own hierarchical sets of characteristics that made up their respective confidence values, reputation values, anomalous flow functions, and the like, the system is able determine these values for the super node ei1 by merging the hierarchical characteristics based on each underlying characteristic's hierarchical level. For example, the system may average out values of each analyzed characteristic for a confidence value at the respective levels of the hierarchy and then determine the overall confidence value for the super node ei1 based on the hierarchical positions of the averaged values.

In this way, the system is able to assemble or construct a better representation of the network of accounts and their interactions in the form of a directed subgraph 700*d* that analyzes the network based only on unique influencers of accounts (e.g., owners of multiple accounts, influencers of multiple accounts that are not technically the owners of all of those accounts), and not just the actions of the accounts themselves. In this way, the system is able to perform hierarchical anomaly detection at different levels of abstraction for a network by lumping multiple interconnected nodes into super nodes and performing analysis on the nodal network with the super nodes present.

While a directed graph is utilized to illustrate one embodiment of a system for collapsing or otherwise lumping multiple nodes into a super node (i.e., subgraphs 700*b*, 700*c*, and 700*d*), it should be known that the system can perform similar steps to collapse multiple nodes of an undirected graph into a single super node. The only difference with the undirected graph is that the directionality of the transfer of funds is not analyzed. However, other transactional data and non-monetary data (e.g., social media relationship data, address data, name data, username data, financial institution application login data, and the lie) can be analyzed to determine that two or more nodes of an undirected graph are highly interconnected within the dynamic undirected graph, and subsequently collapsed into a single super node.

Turning now to FIG. 8, a sample portion (e.g., subset) of a dynamic directed graph 800 that illustrates an anomalous directional flow from a source node to a sink node is provided. As described with respect to block 510 of FIG. 5, a subset of a dynamic directed graph may have a flow anomaly function that is associated with anomalous directional flow from one or more source nodes to one or more sink nodes. As shown in FIG. 8, the subgraph of the directed graph 800 illustrates that a source node has been identified as node ei (indicated by the shading 801). The system may then have analyzed the flow of transactions from this source node ei to identify the other nodes that appear to interact most closely with the node ei, either directly or indirectly through the reception and/or transfer of funds. Through this analysis, the system may have identified the related nodes ej, e1, e2, e3, and e4 as the nodes that are the most affected by, or involved in interacting with, the funds transferred from node ei. The system may then have determined source characterizations and/or sink characterizations for each of these related nodes, and identified node e3 as having a high sink characterization, as indicated by the shading 803.

The system is then able to analyze the flow of funds that originate from the source node ei, across intermediary nodes ej, e1, e2, and e4, and exit the network of the directed graph 800 at the sink node e3. An anomalous flow characterization can be determined for this entire subgraph of the directed graph 800 to determine whether this flow is associated with a malfeasance. For example, if the system determines that the transfers between the intermediary nodes appear to just be an attempt to conceal the origination of funds that are eventually received at the sink node e3, then the system may determine that the anomalous flow characterization for this subgraph of the directed graph 800 is associated with a potential malfeasance.

This type of analysis, using the directed graph 800, is able to identify overall trends and flow characteristics of funds across accounts, and is not deceived by meaningless transfers of funds back and forth between intermediary nodes, because the flow characteristics will show that the funds eventually make their way from the source node ei to the sink node e3. As such, once the system has determined that the subgraph of the directed graph associated with this anomalous directional flow likely is associated with malfeasance, then the system can assign reputation values to the nodes ei, ej, e1, e2, e3, and e4 that are associated with potential malfeasance. Additionally or alternatively, because the system has determined that these nodes appear to be acting under a common influencer entity, the system may collapse all of the nodes ei, ej, e1, e2, e3, and e4 into a single super node for future analysis of the overall directed graph 800. Additional descriptions of how a system may utilize this type of nodal and flow configuration is described with respect to FIG. 10.

FIG. 9, on the other hand, illustrates a sample portion of a dynamic directed graph 900 that illustrates an anomalous directional flow associated with a set of sink nodes. As described with respect to block 510 of FIG. 5, a subset of a dynamic directed graph may have a flow anomaly function that is associated with anomalous directional flow from a plurality of nodes to one or more sink nodes. Such a scenario is represented by the subgraph of the directed graph 900 in FIG. 9, where the system has already identified two sink nodes es and en, where the sink characteristic is represented through the shading 901. The system has then identified additional nodes ei, ej, e1, e2, and e5 that are transferring funds to these sink nodes es and en.

Once the system has identified this subgraph of the directed graph 900 that is representative of two nodes (i.e., node es and node en) with sink characterizations, and the additional nodes ei, ej, e1, e2, and e5 that are known to have transferred funds to the sink nodes es and en within a previous period of time, the system can analyze the overall anomalous flow function for the subgraph, the reputation values for the sink nodes es and en, and/or the confidence values for the edges 902. For example, the system may check the anomalous flow function to determine whether the current flow patterns are similar to or significantly different from the flow patterns for these nodes at earlier points in time. Additionally or alternatively, the system may check the anomalous flow function to determine whether the current flow patterns are similar or significantly different from flow patterns for other close and/or related subgraphs (or sets) of nodes. Furthermore, the system may determine whether the reputation values of the sink nodes es and en are associated with a potential malfeasance, including a check to determine whether the sink characteristics are longstanding or a recent change that could indicate the occurrence of a malfeasance. Furthermore, the system may analyze the confidence values of the edges 902 to determine whether the alleged purposes of the transactions appears to be legitimate or likely associated with a malfeasance. Additional descriptions of how a system may utilize this type of nodal and flow configuration is described with respect to FIG. 11.

While the anomalous directional flow analyses described with respect to FIG. 8 and FIG. 9 describe making determinations based on the set of nodes and edges, it should be known that in some embodiments an anomalous directional flow analysis is determined based solely on characteristics and information about a set of nodes, based solely on characteristics and information about a set of edges, or a combination of some nodes and some edges in a subgraph or other set of nodes and edges of the overall graph.

Referring now to FIG. 10, a flowchart is provided to illustrate one embodiment of a process 1000 for anomaly detection based on dynamic graph network flow analysis, in accordance with embodiments of the invention. In some embodiments, the process 1000 may include block 1002, where the system receives transaction information for a plurality of financial accounts including, for each transaction, transaction amounts, transaction times, payor financial account information, payee financial account information, and non-monetary data like contact with customers, customer login information, social media information, and the like. This block 1002 may be conducted in substantially the same manner as block 502 of FIG. 5.

In some embodiments, the process 1000 includes block 1004, where the system generates a plurality of dynamic directed and undirected graphs, each comprising a plurality of nodes and a plurality of edges, where each of the plurality of nodes is associated with at least one of the plurality of financial accounts, and where each of the plurality of edges is associated with at least a net transfer amount and a net transfer direction between two of the plurality of nodes. This block 1004 may be conducted in substantially the same manner as block 504 of FIG. 5.

As described with respect to FIG. 7A, the system may adjust one or more of the generated directed or undirected graphs to combine nodes that are highly interconnected into super nodes, such that each node represents a substantially independent influencing control from the other nodes in the network. Therefore, in some embodiments, the system may identify, from the plurality of directed and undirected graphs, a second nodal set of one or more of the each pair of nodes linked by an edge with an aggregate custom entropy and divergence value associated with interconnectivity. In response to identifying the second nodal set, the system may collapse this second nodal set into a single node (i.e., a super node) that represents the one or more of the each pair of nodes linked by an edge of the second nodal set as if it was associated with a single financial account.

Additionally, in some embodiments, the process 1000 includes block 1006, where the system calculates, for each pair of nodes linked by an edge, a custom entropy and divergence value relative to other nodes and edges that are within one degree of separation from the respective pair of nodes linked by the edge. This custom entropy and divergence value may be the flow anomaly function described with respect to block 510 of FIG. 5. As such, the custom entropy and divergence value may be determined based on a hybrid of values combined from the nodal characteristics (e.g., reputation values of the nodes) and on the edge characteristics (e.g., confidence values for the edges). For example, the system may utilize hybrid metrics that combine reputation values for nodes based on edge attributes, and reputation values for nodes based on the node attributes, joining these values together to calculate an anomaly function. Similarly, once custom entropy and divergence values have been identified for a set of nodes, the system may additionally analyze a different set of nodes in the hierarchy of nodes (e.g., analyzing a nodal set with nodes that have collapsed into a super node, analyzing nodes individually when they were previously analyzed as a super node, and the like).

The "closest subgraph" for which the entropy and divergence value is determined against for each pair of nodes may be the set of nodes that are within a single degree of separation from the pair of nodes (or an analyzed subgraph of nodes). As used herein, the reference to a single degree of separation means that the nodes are directly connected (i.e., by an edge) to at least one of the nodes being analyzed. However, the entropy and divergence value analysis may additionally be performed against nodes within greater degrees of separation from the analyzed nodes. For example, the analysis may be based on nodes that are within two degrees of separation (i.e., within a single degree of separation from nodes that are one degree of separation out from the nodes being analyzed), within three degrees of separation (i.e., within a single degree of separation from nodes that are two degrees of separation out from the nodes being analyzed), or the like.

By determining a custom entropy and divergence value for the analyzed nodes, as compared to the closest subgraph of nodes, the system is able to identify flow patterns and other nodal or edge characteristics that are significantly different from what is normal or common for nodes that are expected to be relatively similar to the analyzed nodes. In some embodiments, the custom entropy and divergence value is directly correlated to the analyzed pair of nodes being anomalous, as compared to the closest subgraph of nodes. In some such embodiments, a predetermined threshold value may be established, where a determined custom entropy and divergence value that is above the predetermined threshold value is assigned an association of being directed to being significantly anomalous (e.g., associated with an anomalous directional flow).

The process 1000 may also include block 1008, where the system identifies, for a first nodal set of the one or more of the each pair of nodes linked by an edge, an aggregate custom entropy and divergence value associated with anomalous directional flow from a first node of the first nodal set to a second node of the first nodal set. Again, the custom entropy and divergence values may be the same as the flow anomaly function of block 510 of FIG. 5.

The first nodal set may be identified by first identifying a source node as a node with a most significant (e.g., highest valued, most connected, or the like) source characterization. The system may then identify a plurality of nodes linked to the source node both directly and indirectly through edges and intermediary nodes. The system may then analyze the sink characterizations of this plurality of nodes linked to the source node to identify the node(s) with a highest sink characterization. This node can then be designated by the system as a sink node. The system then identifies the entire first nodal set by identifying the nodes that are intermediary between the source node and the sink node. An example of a set of nodes that would be considered the first nodal set is provided in FIG. 8.

Based on block 1006, each connected pair of nodes in the first nodal set will already have a custom entropy and divergence value. Therefore, in one embodiment, the system may average the custom entropy and divergence values for each of the connected pairs of nodes in the first nodal set to determine the custom entropy and divergence value for the entire first nodal set. In other embodiments, the system may analyze the nodal, edge, and flow characteristics of the entire first nodal set to generate a new custom entropy and divergence value for the first nodal set, as compared to other nodes outside of the first nodal set (e.g., within a first, a second, a third, or the like, degree of separation from the nodes in the first nodal set).

In some embodiments, the process 1000 includes block 1010 where, in response to determining that the aggregate custom entropy and divergence value is associated with the anomalous directional flow from the first node to the second node, the system executes a remediation action for one or more accounts associated with the first nodal set. This determination that a remediation action should occur may additionally be conditioned on a determination that the anomalous directional flow within the first nodal set is associated with a potential malfeasance. For example, the system may determine if this anomalous directional flow is uncharacteristic of the historical flow through the first nodal set (indicative of a potential malfeasance), or if this anomalous directional flow has been occurring for a long period of time (e.g., several months, several years, or the like) without a report of a potential malfeasance (indicative of an unlikelihood of malfeasance).

In some embodiments, the step of executing the remediation action for the one or more accounts associated with the first nodal set comprises receiving a subsequent request to transfer funds (e.g., via a transaction application portal managed by or otherwise accessible to the managing entity system) from a first financial account that is associated with the first nodal set to a second financial account that is associated with the first nodal set. These first and second accounts may both be accounts that are represented by the source node, the sink node, and/or an intermediary node of the first nodal set. In some embodiments, one of the first and second accounts may be associated with a node that is outside of the first nodal set, but is still requesting an interaction with a node that is within the first nodal set. In response to receiving this subsequent request to transfer the funds from the first financial account to the second financial account, the system may automatically reject the subsequent request to transfer the funds based on the likelihood that the transaction is associated with or would be subject to a potential malfeasance.

In other embodiments, in response to receiving the subsequent request to transfer the funds from the first financial account to the second financial account, the system may prompt a computing device associated with the first financial account (e.g., via a transaction application portal on a mobile phone, a personal computer, or the like) to request additional authentication credentials of a user associated with the first financial account. This user associated with the first financial account may be an owner of the account, a manager of the account, or any other individual that is authorized to execute transactions using funds from the first financial account. In some embodiments, this request for authentication credentials may be a request for additional, supplemental, extra or other authentication credentials from what is normally required to execute the transaction. For example, the system may normally just require a username and password to authorize a transaction through the transaction application. However, due to the potential presence of a malfeasance, the system may be requesting more stringent authorization credentials such as answers to security questions, biometric information or scans, codes provided through two-factor authentication techniques, or the like.

The system may then receive a set of authentication credentials from the computing device associated with the first financial account and compare the received set of authentication credentials against a database comprising the known authentication credentials for the user associated with the first financial account. If the received authentication credentials match the known authentication credentials of the user, then the system may authorize or otherwise execute the transaction. However, if the received authentication credentials do not match the user's known authentication credentials, then the system may deny or reject the transaction. In such scenarios, the system may implement additional actions such as adjusting a reputation value for the node associated with the first financial account, the second financial account, and/or the rest of the accounts in the first nodal set, to a value that is associated with potential malfeasance or likely malfeasance.

In some embodiments, the system's execution of the remediation action may comprise the generation of a potential malfeasance report. This potential malfeasance report may include information associated with or derived from the first nodal set. This information may include, but is not limited to, the determined aggregate custom entropy and divergence value, an explanation of the anomalous directional flow (e.g., a written explanation of how the first nodal set has a transaction flow characterization that is associated with concealing the origination of funds, or the like), a type of malfeasance associated with the anomalous directional flow (again, concealing the origination of funds), account information for each of the accounts associated with the first nodal set (e.g., account owner information, account owner contact information, account types, transaction histories, and the like), and other information that may be pertinent to an investigation of malfeasance for the first nodal set.

Once this potential malfeasance report has been generated, the potential malfeasance report may be transmitted to a computing device associated with a regulatory body within the managing entity system and/or to a computing device associated with a government entity system that is configured to receive, process, and investigate potential malfeasance reports. In some embodiments, the potential malfeasance report may be transmitted to one or more of the accounts represented by the nodes of the first nodal set, particularly the intermediary nodes between the source and sink nodes, along with a warning or alert that the potential malfeasance appears to be conducted through the use of those accounts.

Additionally or alternatively, the system may execute the remediation action by automatically freezing the financial accounts associated with the first nodal set for at least a period of time during which an investigation into the potential malfeasance can be conducted. In this way, the system will prevent or mitigate future malfeasant dealings as soon as the potential malfeasance has been detected.

Referring now to FIG. 11, a flowchart is provided to illustrate one embodiment of a process 1100 for anomaly detection based on dynamic directed and undirected graph network flow analysis, in accordance with embodiments of the invention. In some embodiments, the process 1100 may include block 1102, where the system receives transaction information for a plurality of financial accounts comprising, for each transaction, transaction amounts, transaction times, payor financial account information, and payee financial account information. This block 1102 may be conducted in substantially the same manner as block 502 of FIG. 5.

In some embodiments, the process 1100 includes block 1104, where the system generates a plurality of dynamic directed and undirected graphs, each comprising a plurality of nodes and a plurality of edges, where each of the plurality of nodes is associated with at least one of the plurality of financial accounts, and where each of the plurality of edges is associated with at least a net transfer amount and a net transfer direction between two of the plurality of nodes. This block 1104 may be conducted in substantially the same manner as block 504 of FIG. 5.

As described with respect to FIG. 7A, the system may adjust one or more of the generated directed and undirected graphs to combine nodes that are highly interconnected into super nodes, such that each node represents a substantially independent influencing control from the other nodes in the network. Therefore, in some embodiments, the system may identify, from the dynamic directed and undirected graphs, a second nodal set of one or more of the each pair of nodes linked by an edge with an aggregate custom entropy and divergence value associated with interconnectivity. In response to identifying the second nodal set, the system may collapse this second nodal set into a single node (i.e., a super node) that represents the one or more of the each pair of nodes linked by an edge of the second nodal set as if it was associated with a single financial account.

Additionally, in some embodiments, the process 1100 includes block 1106, where the system calculates, for each pair of nodes linked by an edge, a custom entropy and divergence value relative to other nodes and edges that are within one degree of separation from the respective pair of nodes linked by the edge. This custom entropy and divergence value may be the flow anomaly function described with respect to block 510 of FIG. 5. As such, the custom entropy and divergence value may be determined based on a hybrid of values combined from the nodal characteristics (e.g., reputation values of the nodes) and on the edge characteristics (e.g., confidence values for the edges).

The "closest subgraph" for which the entropy and divergence value is determined against for each pair of nodes may be the set of nodes that are within a single degree of separation from the pair of nodes (or an analyzed subgraph of nodes). As used herein, the reference to a single degree of separation means that the nodes are directly connected (i.e., by an edge) to at least one of the nodes being analyzed. However, the entropy and divergence value analysis may additionally be performed against nodes within greater degrees of separation from the analyzed nodes. For example, the analysis may be based on nodes that are within two degrees of separation (i.e., within a single degree of separation from nodes that are one degree of separation out from the nodes being analyzed), within three degrees of separation (i.e., within a single degree of separation from nodes that are two degrees of separation out from the nodes being analyzed), or the like.

By determining a custom entropy and divergence value for the analyzed nodes, as compared to the closest subgraph of nodes, the system is able to identify flow patterns and other nodal or edge characteristics that are significantly different from what is normal or common for nodes that are expected to be relatively similar to the analyzed nodes. In some embodiments, the custom entropy and divergence value is directly correlated to the analyzed pair of nodes being anomalous, as compared to the closest subgraph of nodes. In some such embodiments, a predetermined threshold value may be established, where a determined custom entropy and divergence value that is above the predetermined threshold value is assigned an association of being directed to being significantly anomalous (e.g., associated with an anomalous directional flow).

The process 1100 may also include block 1108, where the system identifies a first nodal set of a first node and one or more additional nodes linked to the first node by an edge with an aggregate custom entropy and divergence value associated with anomalous directional flow from the one or more additional nodes to the first node. Again, the custom entropy and divergence values may be the same as the flow anomaly function of block 510 of FIG. 5.

The first nodal set may be identified by first identifying a sink node as a node having a most significant (e.g., highest valued, most connected, or the like) sink characterization of nearby nodes. The system may then identify a plurality of nodes that have edges (i.e., connectivity) associated with directional flow that is mostly to the sink node. For example, the system may identify a set of nodes that are associated with an aggregate transaction amount to the sink node that is a predetermined percentage above the aggregate transaction amount from the sink node back to each node. Alternatively, the system may identify the set of nodes through the aggregate transaction amount to the sink node for each additional node being at least an order of magnitude greater than the aggregate amount of transactions from the sink node back to each additional node.

This configuration is indicative of a network of accounts where many of the accounts are transmitting funds to a single account or common group of accounts. While this type of network by itself may not necessarily be nefarious or likely associated with malfeasance, a subsequent analysis of the first nodal set may determine one or more characteristics of the first nodal set that may trigger an indication that the first nodal set is associated with a malfeasance. For example, if the sink characterization for the first node is a deviation from the historical flow characterization (e.g., source characterization, sink characterization, anomalous flow function, or the like) of that first node, then the system may determine that the first nodal set is potentially associated with a malfeasance. Similarly, if the first node recently became active (e.g., the account(s) associated with the first node recently opened or recently began interacting with other accounts through transactions), then the system may determine that the first nodal set is associated with a malfeasance.

In some embodiments, the system may additionally analyze the first nodal set to determine whether the anomalous directional flow of the first nodal set is also associated with a potential malfeasance. As such, the system may additionally or alternatively determine that the first node of the first nodal set exhibits transaction characteristics that are common with deceitful transaction practices, and therefore determine that the first nodal set likely is associated with a malfeasance. For example, the system may determine that the first node interacts with each of the additional nodes in the first nodal set in a common manner: first by transferring a small amount of funds to the account(s) associated with an additional node and then receiving a large amount of funds (e.g., one or more magnitudes greater than the small amount) back from the additional node. In another example of likely malfeasance, multiple transactions of a small amount of funds may be processed from an additional node to the first node over a certain period of time (e.g., a week, a month, a year, or the like) before a large amount of funds are transferred from the account(s) of the additional node to the first node. Furthermore, the first nodal set may be determined to be associated with a potential malfeasance based on the system receiving a report or allegation of malfeasance for the first node.

Finally, the process 1100 may include block 1110 where, in response to determining that the aggregate custom entropy and divergence value is associated with the anomalous directional flow from the one or more additional nodes to the first node (and possibly in response to a determination that the first nodal set likely is associated with a malfeasance), the system execute a remediation action for one or more accounts associated with the first nodal set.

In some embodiments, the execution of the remediation action may be conducted in response to receiving a subsequent request to transfer funds to a first account associated with the first node of the first nodal set. This request may be received from a computing device of a user via a transaction application portal managed by or otherwise accessible to the managing entity system. The user may be an owner of the account, a manager of the account, or any other individual that is authorized to execute transactions using funds from the account. In response to receiving this subsequent request to transfer the funds to the first financial account (which is associated with the sink node), the system may automatically reject the subsequent transfer to transfer the funds.

In other embodiments, the system may prompt a computing device associated with the first financial account (which is associated with the sink node) to request additional authentication credentials of the user associated with the first financial account. This request for authentication credentials may be a request for additional, supplemental, extra or other authentication credentials from what is normally required to execute the transaction. For example, the system may normally just require a username and password to authorize a transaction through the transaction application. However, due to the potential presence of a malfeasance, the system may be requesting more stringent authorization credentials such as answers to security questions, biometric information or scans, codes provided through two-factor authentication techniques, or the like. As such, the system may then receive a set of authentication credentials from the computing device associated with the first financial account and compare the received authentication credentials against a database of known authentication credentials of the user associated with the first financial account. If the received credentials match the known credentials, the system may authorize this subsequent request to transfer the funds. However, if the received credentials do not match the known credentials then the system can automatically deny or reject the transaction and take other actions like freezing the first financial account associated with the sink node.

Additionally or alternatively, the system can generate reports and/or alerts about the potential malfeasance associated with the first nodal set. For example, the system may generate a potential malfeasance report for the first nodal set, where the potential malfeasance report comprises one or more of the following characteristics and information: the aggregate custom entropy and divergence value, an explanation of the anomalous directional flow from the one or more additional nodes to the first node, a type of malfeasance associated with the anomalous directional flow, and account information for each of the accounts associated with the first nodal set. This potential malfeasance report may then be transmitted to a government or regulatory entity system that is configured to receive and process potential malfeasance reports. Additionally or alternatively, the system may transmit the potential malfeasance report to computing devices of one or more users that are associated with the additional nodes of the first nodal set that have been entering into or have requested to enter into at least one transaction with the first node.

Furthermore, the system may generate a potential malfeasance alert. This alert may comprise one or more of the following characteristics and information: an indication that aa transaction to the first account may be associated with a malfeasance, a type of the malfeasance, an explanation of the type of the malfeasance, the aggregate custom entropy and divergence value, and an amount or percentage of funds that are recoverable from a transaction to the first account due to the indication that the transaction to the first account may be associated with the malfeasance. If the system receives a request from a computing device of a user to transfer an amount of funds to the first account, then the system can transmit the generated potential malfeasance alert to the computing device of the user, thereby alerting the user to the potential malfeasance and allowing the user to make an informed decision as to whether to continue executing the requested transaction or not.

Referring now to FIG. 12, a flowchart is provided to illustrate one embodiment of a process 1200 for active malfeasance examination and detection based on dynamic directed graph network flow analysis, in accordance with embodiments of the invention. The process flow 1200 illustrates one or more steps associated with dynamically detecting malfeasance and executing actions to remediate the malfeasance.

In some embodiments, the process 1200 may include block 1202, where the system receives transaction information for a plurality of financial accounts comprising, for each transaction, transaction amounts, transaction times, payor financial account information, and payee financial account information. As explained above in detail in block 502 of FIG. 5, the system extracts transaction information from internal databases of a managing entity (e.g., a financial institution, a peer-to-peer transaction application management system, or the like), and/or may be collected from one or more entities that have an agreement to provide the transaction information to a managing entity (e.g., a consortium of financial institutions that participate in or manage a common transaction application for customers of the financial institutions). The extracted transaction information may further include information about how long each account has been open, timing between transactions (e.g., transaction frequencies), reputation values for accounts or users associated with accounts, duration of time that two accounts have been making transactions between each other (i.e., duration of a connection between accounts), historical transaction information, account balance histories, reports of malfeasance or potential malfeasance for one or more of the accounts and/or transactions, transaction types, goods or services associated with each transaction, types of accounts, type of computing device(s) associated with each transaction, computing device confidence values, type or level of authentication on each computing device associated with executing each transaction, financial institution information for each account and/or transaction, recovery potential for each transaction, or the like.

Additionally, in some embodiments, the process 1200 includes block 1204, where the system generates a dynamic directed graph comprising a plurality of nodes and a plurality of edges, where each of the plurality of nodes is associated with at least one of the plurality of financial accounts, and where each of the plurality of edges is associated with at least a net transfer amount and a net transfer direction between two of the plurality of nodes. As explained in detail in block 504 of FIG. 5, this generated directed graph may represent all transaction information for a specific period of time. Each node of the directed graph represents at least one account associated with a user. The edges of the directed graph represent transactions between each of the nodes in the directed graph. In some embodiments, the edge may represent a single transaction or a collection of all transaction between each of the nodes. The plurality of nodes may be associated with one or more of financial institutions, customers of a financial institution, account of the customers, devices of the customers, or the like.

Furthermore, in some embodiments, the process 1200 includes block 1206, where the system calculates, for each node of the plurality of nodes, a custom reputation value based at least on one or more factors. In one embodiment, the one or more factors may include at least one of a transaction history for an account associated with each respective node, a malfeasance history for the account associated with each respective node, entity information associated with an entity that owns or manages each respective node, a nodal anomaly score for each respective node, and a transaction anomaly score for one or more edges of each respective node. In some embodiments, the transaction history for an account may include time duration of the account. The time duration of the account may be a time period from when the account was initially used to perform transactions (e.g., receiving or executing transactions).

In some embodiments, the transaction history for an account may include a determination about the connectivity between the account and at least one other account associated with a transaction. The system may analyze historical transaction data for the accounts to determine whether previous transactions between these accounts have occurred (indicative of a low probability of malfeasance for a current or most recent transaction between the accounts), and whether a similar transaction has occurred between the accounts (indicative of a high probability that malfeasance is not occurring in a current or most recent transaction between the accounts). For example, the system may identify that an amount of $500 is transferred from account 'A' to account 'B' every month and may determine that the accounts associated with the transactions and similar future transactions to have low probability of malfeasance. In some embodiments, the transaction history may include length of connectivity between the account and at least one other account associated with a transaction. For example, the system may identify that an amount $500 is being transferred from account 'A' to account 'B' every month for the last five years and may identify that the accounts associated with the transactions to have low probability of malfeasance. In some embodiments, the transaction history of an account may include amount and/or frequency of historical transactions. For example, the system may identify that an amount $500 is being transferred from account 'A' to account 'B' every month and may determine that a transaction of $10,000 between account 'A' and account 'B' as out of the ordinary. The system may consider such a transaction as having a high probability of malfeasance and may alter the custom reputation value of the account 'A' and account 'B'. In another example, the system may identify that an amount $500 is being transferred from account 'A' to account 'B' every month and may determine that multiple transactions of $500 within a single month as out of the ordinary and may alter the custom reputation value of the account 'A' and account 'B'.

In some embodiments, the malfeasance history may include all previously reported malfeasant transactions by one or both the accounts. In some embodiments, the malfeasance history may include unreported malfeasant transactions. The system may identify unreported malfeasant transactions based on with patterns and/or characteristics that are common in malfeasant transactions.

In some embodiments, the entity information associated with entities linked to the two accounts may include connection between the entities, length of connection between the entities, location of the entities. For example, the system may identify that account 'B' is linked with a financial institution located in a different country and may decrease the custom reputation value associated with account 'B'. In another example, the system may identify that the length of connection between a financial institution '1' associated with account 'A' and financial institution '2' associated with account 'B' is less than a month and may determine that the transactions between the financial institution '2' and the financial institution '1' as having a high probability of malfeasance and may decrease the custom reputation value of account 'A' and account 'B'. The system may modify the custom reputation values of account 'A' and account 'B' after a span of one year or six months. In some embodiments, the nodal anomaly score for each respective node is determined based on a custom entropy and divergence value relative to other nodes of the plurality of nodes. In some embodiments, transaction anomaly score for the one or more edges of each respective node is based on a custom entropy and divergence value relative to other nodes and edges of the plurality of nodes and the plurality of edges that are within one degree of separation from the respective node.

In some embodiments, the one or more factors may also include characterization information associated with the accounts linked with the nodes. The characterization information may comprise account balance, or the like. In some embodiments, the one or more factors may include a recoverability value. The recoverability value may be associated with the amount that can be recovered when a user disputes a transaction. For example, if a transaction is associated with a financial institution that is located in a different country, the recoverability value may be very less, thereby improving the factor. As such, the system may assign a low custom reputation value to all the accounts associated with such financial institution. In some embodiments, the one or more factors may include device characteristics associated with the accounts linked with the nodes. For example, an account 'A' linked to a mobile device may have a low level authentication and the custom reputation value assigned to such an account may be low. In another example, an account 'B' linked to a mobile device may have a high level authentication and the custom reputation value assigned to such an account may be high.

The process 1200 may also include block 1208, where the system identifies a first node of the plurality of nodes comprising a custom reputation value associated with a malfeasance. In some embodiments, the system may identify that the first node is associated with malfeasance based on determining that the custom reputation value associated with the first node is below a predetermined value. The system, in response to identifying that the first node is associated with malfeasance, identify a first user linked to the first node.

In some embodiments, the process 1200 includes block 1210, where the system identifies contact information for the first user associated with the first node. The system may extract contact information from any of the internal databases of a managing entity and/or may collect from one or more entities that have an agreement to provide the transaction information to the managing entity. The user information or contact information may include at least a full name, phone number, mailing address, email address, social networking, or the like.

Additionally, in some embodiments, the process 1200 includes block 1212, where the system communicates a transaction request to a computing device associated with the first user, based on the identified contact information for the user, wherein the transaction request is transmitted as if from a potential target of the malfeasance. In other words, the system may transmit a transaction request from an impersonator node to the first node. The system may dynamically create an impersonator node based on one or more characteristics associated with other targets associated with the malfeasance. For example, the first node may receive transactions from account 'X' and account 'Y' and based on the characteristics associated with the account 'X' and account 'Y', the system may create an account 'Z' having similar characteristics as that of the account 'X' and account 'Y'. The system may create an impersonator transaction request from the impersonator node to match the transaction requests sent from the account 'X' and account 'Y'. For example, the system sets the transaction amount of the impersonator transaction request to match the transaction amounts of the transaction requests sent from the account 'X' and account 'Y'. The system may transfer the created impersonator transaction request to a first account associated with the first node based on the contact information extracted in block 1210. For example, the system may transfer the created impersonator transaction request to a mobile device associated with the phone number of the first user. The process 1200 may include block 1214, in response to transmitting the transaction request to the computing device, the system receives an acceptance of the transaction request from the computing device of the first user.

In some embodiments, creating the impersonator node may further comprise dynamically creating one or more external communication channels. The external communication channels may include social networking, text messaging comprising at least a phone number and/or an email address, and the like. The system in response to dynamically creating the one or more external communication channels, initiates external communication with the user based on the contact information. For example, the system may create dynamic text messages and may initiate communication with the user, via the phone number, before sending an impersonator transaction request from the impersonator node.

Finally, the process 1200 may continue to block 1216, where the system, in response to receiving the acceptance of the transaction request, executes a remediation action on one or more accounts of the user. In some embodiments, the remediation action may comprise blocking one or more accounts associated with the first user form sending subsequent transaction requests to other accounts. In some embodiments, the remediation action may comprise freezing the one or more account of the user from accepting transaction requests from other accounts. In some embodiments, the remediation action may comprise challenging a payee of the subsequent transaction request with additional authentication before permitting execution of the transaction request. In some other embodiments, the remediation action may comprise transmitting a notification associated with the first user to third party entity (e.g., a government agency system), where the notification may include user information associated with the first user and account information associated with the one or more accounts of the first user. In some embodiments, the remediation action may comprise transmitting an alert to a sender of transaction requests to the first user. For example, the system may identify that a second user is trying to initiate a transaction to at least one of the one or more accounts of the first user and the system may transmit an alert to the second user before accepting the transaction request from the second user. In an exemplary embodiment, the malfeasance may be associated with elders over 60 years.

Referring now to FIG. 13, a flowchart is provided to illustrate one embodiment of a process 1300 for pattern-based examination and detection of malfeasance through dynamic directed graph network flow analysis, in accordance with embodiments of the invention. The process flow 1300 illustrates one or more steps associated with identifying activity or schemes that conceal the true nature of one or more transactions and remediating such activity.

In some embodiments, the process 1300 may include block 1302, where the system extracts historical transaction information for a first plurality of financial accounts, wherein the historical transaction information is associated with a historical transactions that occurred during a first period of time. The historical transaction information comprises at least, for each transaction, transaction amounts, transaction times, payor financial account information, and a payee financial account information. As explained above in detail in block 502 of FIG. 5, the system extracts transaction information from internal databases of a managing entity (e.g., a financial institution, a peer-to-peer transaction application management system, or the like), and/or may be collected from one or more entities that have an agreement to provide the transaction information to a managing entity (e.g., a consortium of financial institutions that participate in or manage a common transaction application for customers of the financial institutions). The extracted historical transaction information may further include information about how long each account has been open, timing between transactions (e.g., transaction frequencies), reputation values for accounts or users associated with accounts, duration of time that two accounts have been making transactions between each other (i.e., duration of a connection between accounts), account balance histories, reports of malfeasance or potential malfeasance for one or more of the accounts and/or transactions, transaction types, goods or services associated with each transaction, types of accounts, type of computing device(s) associated with each transaction, computing device confidence values, type or level of authentication on each computing device associated with executing each transaction, financial institution information for each account and/or transaction, recovery potential for each transaction, or the like.

Additionally, in some embodiments, the process 1300 includes block 1304, where the system generates a historical directed graph comprising a plurality of nodes and a plurality of edges, where each of the plurality of nodes is associated with at least one of the first plurality of financial accounts from the extracted historical information, and where each of the plurality of edges is associated with at least a net transfer amount and a net transfer direction between two of the plurality of nodes. As explained in detail in block 504 of FIG. 5, this generated historical directed graph may represent all historical transaction information for the first period of time. Each node of the historical directed graph represents at least one account associated with a user. The edges of the directed graph represent transactions between each of the nodes in the directed graph. In some embodiments, the edge may represent a single transaction or a collection of all transaction between each of the nodes.

Furthermore, in some embodiments, the process 1300 includes block 1306, where the system identifies, from the historical transaction information, a historical set of transactions associated with a malfeasance. In some embodiments, the system may identify the historical set of transactions associated with malfeasance based on the reported malfeasance transactions. In some embodiments, the system identifies the unreported malfeasance transactions based at least on the custom reputation value of each node associated with the historical directed graph and anomaly values of each node associated with the historical directed graph.

The process 1300 may also include block 1308, where the system determines, from the historical directed graph, a malfeasance pattern of node characteristics, edge characteristics, and nodal interactions associated with the malfeasance. After identifying the historical set of transactions that are associated with malfeasance, the system identifies all transactions associated with accounts linked with each of the historical set of transactions and identifies a malfeasance pattern based on the frequency of the transactions linked with the accounts, transaction amounts, direction of flow of transactions, common nodes (e.g., sources nodes and sink nodes), and other node and edge characteristics such as length of connectivity between the nodes, time duration of the accounts associated with the node, entities associated with the node, and the like. In some embodiments, the malfeasance pattern may be associated with a set of nodes. In other embodiments, the malfeasance pattern may be associated with a set of edges. In some embodiments, the malfeasance pattern may be associated with any combination of nodes and edges. In some embodiments, the malfeasance pattern may be associated with a sequence of events related to a combination of nodes and edges.

In one exemplary embodiment, the system identifies one or more transactions between node 'A' and node 'Z' via multiple other nodes and may determine such an activity as a malfeasance pattern. In one exemplary embodiment, the system may identify that an account associated with node 'A' was created at a first location and one or more transactions linked to the account are incoming transactions originating from a second location and may determine such an activity as a malfeasance pattern. In one exemplary embodiment, the system may identify one or more transactions between node 'A' and node 'Z' via multiple other nodes and may further identify that a transaction amount in an account associated with node 'Z' was withdrawn within a short time span and may then determine such an activity as a malfeasance pattern. In some embodiments, the system identifies the malfeasance pattern based on a set of rules in an existing database.

In some embodiments, after identifying the at least one malfeasance pattern, the system may store the at least one malfeasance pattern in a malfeasance pattern library of the system. The system may continuously update the historical directed graph based on a new set of transactions initiated at or received by the first plurality of financial accounts. In some embodiments, the machine learning or artificial intelligence module of the system may continue to learn and identify new patterns in the historical dynamic graph and the updated historical dynamic graph and may store the new patterns in the malfeasance pattern library.

In some embodiments, the process 1300 includes block 1310, where the system receives current transaction information for a second plurality of financial accounts, wherein the current transaction information is associated with a current set of transactions that occurred or are occurring during a second period of time that begins after a beginning of the first period of time. The system receives current transaction information comprises at least, for each transaction, transaction amounts, transaction times, payor financial account information, and a payee financial account information. In some embodiments, the system may receive current transactions from a managing entity systems and other entity systems. For example, when a transaction is submitted by a user from a computing device to an entity system, the transaction is also submitted to the system of the present invention.

Additionally, in some embodiments, the process 1300 includes block 1312, where the system generates a current dynamic directed graph comprising a current plurality of nodes and a current plurality of edges, based on the current transaction information. As explained in detail in block 504 of FIG. 5, this generated historical directed graph may represent all current transaction information for the second period of time. Each current node of the current directed graph represents at least one account associated with a user. The current edges of the directed graph represent transactions between each of the nodes in the current dynamic directed graph. In some embodiments, the edge may represent a single transaction or a collection of all transaction between each of the nodes. The system may receive the new current set of transactions dynamically and may dynamically update the current dynamic directed graph in response to receiving new current set of transactions.

The process 1300 may include block 1314, where the system monitors the current dynamic directed graph and identifies a current malfeasance pattern matching the at least one malfeasance pattern based on monitoring the current dynamic directed graph. The system may identify the current malfeasance pattern by tracking and comparing current node characteristics, current edge characteristics, and current nodal interactions to characteristics associated with one or more patterns stored in the malfeasance pattern library. In some embodiments, identifying the current malfeasance pattern comprises at least identifying a match between one or more factors of the plurality of nodes associated with the first plurality of accounts and the current plurality of nodes associated with the second plurality of accounts. The one or more factors comprise at least one of reputation scores, entropy values, divergence values, frequency of transactions, timing of the transactions, resource distribution amounts associated with the transactions, connectivity characteristics. For example, the system may identify that two current nodes are connected via six other current nodes, wherein any of these nodes are associated with reported malfeasance and may determine that this pattern matches one of the historical malfeasance patterns.

In some embodiments, the system continuously monitors the updates made to the current dynamic directed graph and the artificial intelligence module of the system may predict occurrence of malfeasance when the updates to the current dynamic directed graph match one or more characteristics of a known malfeasance pattern stored in the malfeasance pattern database. In such a case, the system may transfer one or more alerts to the accounts that may be involved in future malfeasance activity. In some embodiments, the system may require additional authentication before performing transactions related to the accounts that may be involved in future malfeasance activity.

In some embodiments, identifying the current malfeasance pattern by matching the current dynamic graph with the at least one malfeasance pattern at a plurality of hierarchical levels. The plurality of hierarchal levels may be associated with each of the current plurality of nodes, each of the current plurality of edges, a group of current plurality of nodes, or a group of current plurality of edges. For example, the system, at one instance, may compare the current dynamic graph with the at least one malfeasance pattern. The system, in another instance, may group the current plurality of nodes into one single node and may compare the hierarchical level of nodes with the at least one malfeasance pattern to identify a current malfeasance pattern.

Finally, the process 1300 may continue to block 1316, where the system, in response to detecting the current malfeasance pattern from the portion of the current dynamic directed graph, executes a remediation action on one or more of the second plurality of financial accounts that are associated with this portion of the current dynamic directed graph associated with the malfeasance. In some embodiments, the remediation action may comprise blocking the second plurality of resource pools from sending resource distribution requests. In some embodiments, the remediation action may comprise freezing the second plurality of resource pools from receiving subsequent one or more resource distribution requests. In some embodiments, the remediation action may comprise prompting a sender of the subsequent one or more resource distribution requests to provide additional authentication credentials before executing the subsequent one or more resource distribution requests. In some embodiments, the remediation action may comprise transmitting a notification associated with the second plurality of resource pools to a third party entity, wherein the notification comprises the current resource distribution request information. The third party entity may be any government agency system. In some embodiments, the system may use a combination of remediation actions described above to remediate schemes that obfuscate the true nature of one or more transactions. In some embodiments, the system after detecting the current malfeasance pattern, may create an impersonator node as discussed above in block 1212 and may initiate at least one of transaction request and a non-transaction requests with one or more nodes of the current dynamic graph that are associated with the current malfeasance pattern.

Referring now to FIG. 14, a flowchart is provided to illustrate one embodiment of a process 1400 for dynamic graph network flow analysis and real time remediation execution. In some embodiments, the process 1400 may include block 1402, where the system extracts transaction information for a plurality of financial accounts, where the transaction information comprises, for each transaction, at least transaction amounts, transaction times, payor financial information, and payee financial information. This block 1402 may be conducted in substantially the same manner as block 502 of FIG. 5.

In some embodiments, the process 1400 includes block 1404, where the system generates a plurality of dynamic directed and undirected graphs, each comprising a plurality of nodes and a plurality of edges based on the extracted transaction information, where each of the plurality of nodes is associated with at least one of the plurality of financial accounts, and where each of the plurality of edges is associated with at least a net transfer amount and a net transfer direction between two of the plurality of nodes. This block 1404 may be conducted in substantially the same manner as block 504 of FIG. 5.

Additionally, in some embodiments, the process 1400 includes block 1406, where the system receives, from a computing device associated with a first node of the plurality of nodes, a request to execute a proposed transaction from the first account associated with the first node to a second account associated with a second node of the plurality of nodes. The system may receive this request from a computing device (e.g., a computing device system 400 of FIG. 1 and FIG. 4) of a party (e.g., a user or other entity) to the proposed transaction.

The process 1400 may also include block 1408, where the system, in response to receiving the request to execute the proposed transaction from the first account to the second account, automatically determines a proposed transaction value for the proposed transaction based on the generated directed and undirected graphs. As used herein, the term "proposed transaction value" may comprise one or more of the following values, metrics, and correlations: a confidence value for an edge between the first node and the second node, a reputation value for the first node and/or the second node, a custom entropy and divergence value associated with a first nodal set that includes the first node and the second node, and a correlation value with a known malfeasance pattern. The proposed transaction value may be determined by analyzing the generated directed and undirected graphs at a current point in time, without taking the proposed transaction into account. However, in some embodiments, the system may dynamically update the directed and undirected graph to include the transaction information of the proposed transaction, as if that transaction has now occurred, and determine the proposed transaction value based on an analysis of this updated dynamic directed and undirected graph. In this way, the system can determine a likelihood of a potential malfeasance associated with the transaction based on historical characteristics of the directed and undirected graph (or a subgraph) while also taking the current transaction information into account.

As such, in some embodiments, the proposed transaction value is determined based on (or otherwise comprises) a confidence value for the edge between the first node and the second node, where the confidence value is based at least in part on historical characterizations of the first node and/or the second node, reported malfeasance history(ies) of the first node and/or the second node, connectivity concerns between the first node and the second node, transaction concerns between the first node and the second node, account or account device characteristics of the first node or the second node, and a recoverability value associated with the proposed transaction between the first node and the second node. This confidence value may be determined in the same manner(s) as described with respect to block 508 of FIG. 5.

Additionally or alternatively, the proposed transaction value may be (or may be determined based on) a reputation value for the first node or the second node. This reputation value may be based at least in part on a transaction and malfeasance history for the first node and/or the second node, entity (e.g., account owner, financial institution, and the like) characteristics associated with the first node and/or the second node, and anomaly values associated with the first node and/or the second node. This reputation value may be determined in the same manner(s) as described with respect to block 506 of FIG. 5 and/or block 1206 of FIG. 12.

Furthermore, the proposed transaction value may comprise (or be determined based on) a custom entropy and divergence value that is associated with anomalous directional flow across a first nodal set that includes the first node and the second node. This custom entropy and divergence value may be determined in the same manner(s) as described with respect to the flow anomaly function described in block 510 of FIG. 5, the custom entropy and divergence value described in block 1006 of FIG. 10, and/or the custom entropy and divergence value described in block 1106 of FIG. 11.

In some embodiments, the proposed transaction value may comprise a correlation value for a portion of one or more of the generated dynamic directed and undirected graphs, as compared with a known malfeasance pattern. This correlation value may be a metric of the correlation of a detected pattern with a known malfeasance pattern, as described with respect to at least blocks 1308 and 1314 of FIG. 13.

In some embodiments, the process 1400 includes block 1410, where the system determines that the proposed transaction value for the proposed transaction is associated with a potential malfeasance. For example, the system may determine that the proposed transaction value is above a predetermined threshold that indicates that the potential transaction likely or possibly is associated with a malfeasance. In other embodiments, where a low transaction value is associated with a potential malfeasance, the system may make a similar determination that the potential transaction value is below an associated predetermined threshold. In embodiments where the potential transaction value is closely associated with an identified pattern of at least a portion of one or more of the directed and undirected graphs, the system may determine that the identified pattern is associated with a potential malfeasance.

In some embodiments, the transaction value is closely associated with an anomaly value (e.g., a divergence of one or both nodes that are parties to the potential transaction as compared to similar nodes, related nodes, or historical characteristics of themselves). Additionally or alternatively, the transaction value is closely associated with an anomaly function, or a custom entropy and divergence value of a set of nodes that includes at least one of the nodes that are parties to the potential transaction, where the anomaly function is indicative of a degree of anomalous flow across a network. These determined anomaly characteristics of the node(s), if determined to be associated with a predetermined threshold of highly anomalous activity, can be triggering characteristics for determining that the transaction value is associated with a potential malfeasance.

In some embodiments, the system utilizes machine learning and/or neural network system analysis to learn malfeasance patterns from the dynamic directed and undirected graph representations. The system may then, through anomaly detection techniques, detect abnormal patterns of one or more of the directed and/or undirected graphs in real time based on the learned malfeasance patterns.

This determination that proposed transaction value is associated with a potential malfeasance may be determined by running an anomaly value detection algorithm on a plurality of directed and undirected dynamic graphs (or other flow diagrams) at different levels of abstraction (e.g., at an entity level, at a node level, for a group of nodes, by organizations, or the like). The resulting anomaly detection algorithm may then combine signals from the individual representations of the hierarchy to make a determination of a likelihood of malfeasance in the overall system.

Additionally, in some embodiments, the process 1400 includes block 1412, where the system generates a potential malfeasance alert comprising an indication that the proposed transaction may be associated with the potential malfeasance, a type of the potential malfeasance, an explanation of the type of the malfeasance, the proposed transaction value, and an amount or percentage of funds that are recoverable from the proposed transaction based on the potential malfeasance. Of course, this set of information that comprises the potential malfeasance alert may be supplemented and/or replaced by other determined characteristics, determined values, stored information, and the like to generate an appropriate and useful potential malfeasance alert.

As such, the potential malfeasance alert for a proposed transaction may include an indication that the proposed transaction may be associated with the potential malfeasance. For example, in embodiments where the proposed transaction value is associated with a potential malfeasance. In alternate embodiments where the proposed transaction value is not associated with the potential malfeasance, the potential malfeasance alert may comprise an indication that the proposed transaction likely is not associated with the potential malfeasance. Furthermore, the potential malfeasance alert may comprise a type of the potential malfeasance. For example, the system may have determined the type of the potential malfeasance by a comparison of the transaction value and/or other nodal and overall graph characteristics and/or determinations to a database of known transaction values and/or other nodal and overall graph characteristics and their associated malfeasances, and this determined type of malfeasance can be included in the potential malfeasance alert. Additionally, the potential malfeasance alert may include an explanation of the type of the malfeasance. This explanation or may be identified in or taken from a stored description of the potential malfeasance.

The potential malfeasance alert may additionally or alternatively include the proposed transaction value. The proposed transaction value may be displayed within the potential malfeasance alert in numerical form, in alphabetical form, in alphanumeric form, as a color-coded indicator, or the like. The system, in generating the potential malfeasance alert, may also include a reputation value of a counterparty to the proposed transaction. This may comprise a reputation value of the node associated with the counterparty to the proposed transaction. Furthermore, the potential malfeasance alert may comprise an explanation of the reputation value of the counterparty. This explanation of the reputation value may be derived or extracted from a stored description of the reputation value and/or from stored descriptions for one or more determined characteristics of the reputation value of the node associated with the counterparty.

In some embodiments, the potential malfeasance alert may comprise an amount or percentage of funds that are recoverable from the proposed transaction based on the potential malfeasance. For example, the potential malfeasance alert may include an indication that the total amount of the proposed transaction is recoverable. Alternatively, the potential malfeasance alert may comprise an indication that half of the total amount of the proposed transaction is recoverable due to the proposed transaction value, or even an indication that none of the total amount of the proposed transaction is recoverable due to the proposed transaction value. Of course any other determined or assigned amount of recoverability may be included in the generated potential malfeasance alert. The system may, in some embodiments, include a request for stepped up authentication credentials from one or more of the parties to the potential transaction within the proposed malfeasance alert. Additionally or alternatively, a request or confirmation for a purpose of the proposed transaction from one or more of the parties to the potential transaction may be included in the potential malfeasance alert.

Of course, other characteristics determined or extracted from the generated directed and undirected graphs (e.g., anomalous values associated with one or more nodes, information associated with an anomalous directional flow across one or more nodes, information about detected patterns that may be associated with potential malfeasance, or the like) may be included in the potential malfeasance alert, especially in embodiments where the system has determined that the transaction value is associated with a potential malfeasance due in large part to one or more of these factors.

Finally, the process 1400 may include block 1414, where the system, in response to generating the potential malfeasance alert, automatically transmits the potential malfeasance alert to the computing device(s) of one or more users associated with the potential transaction (e.g., users that are associated with the first account or the second account). The system may instruct an application (e.g., the transaction application 421, the web browser application 422, and/or the SMS application 423 of FIG. 4) to cause a user interface (e.g., user interface 430 of FIG. 4) of the computing device(s) of the user(s) to present or display the malfeasance alert as an image, a document, a website, an audible message, a printed message, or the like to the user. The system may also instruct or otherwise permit one or more user input devices (e.g., the user input devices 440 of FIG. 4) to receive inputs from the user(s) in response to the displayed potential malfeasance alert, as described herein.

As this potential malfeasance alert may be transmitted to a computing device of a party to the proposed transaction as a notification or warning of a potential malfeasance being associated with the proposed transaction, the transmitted malfeasance alert may include a reputation value (e.g., a reputation value as described with respect to block 506 of FIG. 5 and/or block 1206 of FIG. 12) of the node associated with the counterparty to the proposed transaction.

Therefore, the system may automatically transmit the potential malfeasance alert to a computing device of a first user associated with the proposed transaction, where the potential malfeasance alert includes (among other information and data as described above) a reputation value for a node associated with a second user that is a counterparty of the first user to the proposed transaction. This reputation value may be displayed within the potential malfeasance alert as a numerical value, a percentage value, as a color-coded indicator, or the like in order to convey the system's characterization of the node associated with the second user. For example, if the system determines the reputation value for the node associated with the second user is below (or above) a threshold value and therefore is potentially associated with a malfeasance, then the system may display this reputation value in a prominent manner (e.g., on a top line, in bold lettering or numbering, highlighted in red or yellow, or the like) on the potential malfeasance alert.

The system may additionally include a description of what the reputation value of this node associated with the second user (i.e., the counterparty to the transaction) means or represents, as well as an explanation of the characteristics of the second node that tilted the reputation value towards a value that is associated with potential malfeasance. The displayed reputation value and the description(s) about the determined reputation value enable the first user to understand the potential for a malfeasance in executing the proposed transaction, including specific warning indicators (i.e., the described characteristics of the second node) that enable the first user to make a more-informed decision regarding proceeding with the proposed transaction than if no reputation value had been provided.

In some embodiments, the system may determine that although the proposed transaction value is associated with a potential malfeasance, the likelihood of the proposed transaction actually being malfeasant would be significantly reduced (e.g., the proposed transaction value would be reduced) if one or both of the parties to the proposed transaction provided stepped up authentication credentials. For example, the proposed transaction value may be associated with a potential malfeasance related to a third party taking control of one of the accounts associated with the proposed transaction and executing a transaction without the consent or approval of the actual owner of the account. In such embodiments, the system may include a request for additional authentication credentials from one or both parties to the proposed transaction to compare against known, stored authentication credentials for the parties.

Therefore, in response to generating the potential malfeasance alert, the system may automatically transmit the potential malfeasance alert to a computing device of a first user associated with the proposed transaction, where the potential malfeasance alert comprises at least a request for the first user to provide additional or stepped up authentication credentials. For example, the first user may have already provided a first level of authentication credentials (e.g., a username and password) to enter into a transaction application and request the execution of the proposed transaction. However, the system can increase its confidence that the entity requesting the execution of the proposed transaction is an authorized entity by requesting stepped up authentication credentials like answers to security questions, two-factor authentication input, biometric information input, and/or the like.

The system may then receive a set of input authentication credentials from the computing device of the first user. These input authentication credentials will then be compared to stored stepped up authentication credentials (e.g., information stored in an authentication database and associated with the first user) to determine if the input authentication credentials match the stored stepped up authentication credentials. If the input authentication credentials match the stored stepped up authentication credentials, then the system may adjust the proposed transaction value, determine that the proposed transaction value is no longer associated with a potential malfeasance, and automatically execute the proposed transaction. Alternatively, in response to determining a match, the system may transmit an updated potential malfeasance alert to the computing device of the first user with an indication that the recoverable amount for the proposed transaction has increased in response to the stepped up authentication of the first user. The system can improve the recoverable amount of the proposed transaction because there is a stronger likelihood that this transaction is not associated with the potential malfeasance if the user is authenticated to a higher degree.

However, if the system determines that the input authentication credentials do not match the stored stepped up authentication credentials, then the system may automatically terminate the proposed transaction.

In embodiments where the determined potential malfeasance is associated with a disguising or obfuscation of the actual purpose of the proposed transaction, the system can take steps to determine whether the purpose of the transaction is genuine and commonly understood by one or both of the parties. As such, the system may automatically transmit a malfeasance alert to a computing device of a first user associated with the proposed transaction in response to generating a potential malfeasance alert that comprises at least a request for the first user to provide a purpose for conducting the proposed transaction.

The system may then receive, from the computing device of the first user, an input purpose for conducting the proposed transaction. The system can then compare this input purpose to a database of known purposes for similar transactions (e.g., transactions with the same counterparty node, transactions for similar amounts, and the like) and/or to an input purpose of a second user that is the counterparty to the proposed transaction (e.g., through a similar transaction alert request through a second computing device) to determine whether the input purpose of the first user is valid (i.e., matches, at least to a predetermined degree, a known purpose for similar transactions and/or matches the input purpose of the second user).

In response to determining that the received input purpose of the first user for conducting the proposed transaction is a valid purpose, the system may automatically execute the proposed transaction and/or transmit an updated potential malfeasance alert to the computing device of the first user with an indication that a recoverable amount for the proposed transaction has increased based on the valid or matching purpose. Alternatively, the system may automatically terminate the proposed transaction in response to determining that the received input purpose for conducting the proposed transaction is associated with a purpose that is associated with the potential malfeasance (e.g., the matched purpose within the database is a purpose linked with the potential malfeasance).

As used herein, the term an "account" or "resource pool" may be the relationship that the customer has with the financial institution. Examples of accounts include a deposit account, such as a transactional account (e.g., a banking account), a savings account, an investment account, a money market account, a time deposit, a demand deposit, a pre-paid account, a credit account, or the like. An account may be associated with and/or maintained by a financial institution. As used herein, the terms "resource distribution request," "resource distribution," and "resource distribution events" may refer to a transaction between two resource pools performed using a computing device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/200,077 | SYSTEM FOR ANOMALY DETECTION AND REMEDIATION BASED ON DYNAMIC DIRECTED GRAPH NETWORK FLOW ANALYSIS | Nov. 26, 2018 |
| 16/200,027 | SYSTEM FOR ANOMALY DETECTION AND REMEDIATION BASED ON DYNAMIC DIRECTED GRAPH NETWORK FLOW ANALYSIS | Nov. 26, 2018 |
| 16/200,065 | ACTIVE MALFEASANCE EXAMINATION AND DETECTION BASED ON DYNAMIC GRAPH NETWORK FLOW ANALYSIS | Nov. 26, 2018 |
| 16/200,040 | DYNAMIC GRAPH NETWORK FLOW ANALYSIS AND REAL TIME REMEDIATION EXECUTION | Nov. 26, 2018 |

The invention claimed is:

1. A system for a pattern-based examination and detection of malfeasance through dynamic graph network flow analysis, the system comprising:

a controller for generating directed and undirected graphs, detecting a malfeasance pattern based on the generated directed and undirected graphs, and executing remediation actions, the controller comprising one or more memory devices with a computer-readable program code stored thereon, one or more communication devices connected to a network, and one or more processing devices, wherein the one or more processing devices execute the computer-readable program code to:

receive current resource distribution request information for a second plurality of resource pools, wherein the current resource distribution request information is associated with a current set of resource distribution requests, wherein the current set of resource distribution requests is updated continuously after the ending of a first period of time;

generate a current dynamic graph comprising a current plurality of nodes and a current plurality of edges, wherein each of the current plurality of nodes represents at least one of the second plurality of resource pools from the received current resource distribution request information, and wherein each of the current plurality of edges is associated with at least a net resource distribution amount and a net resource distribution direction between two of the current plurality of nodes, wherein the current dynamic graph is a dynamic directed graph or a dynamic undirected graph;

identify, from the current dynamic graph, a nodal set of one or more pairs of nodes linked by an edge, based on the nodal set having an aggregate customer entropy and divergence value associated with interconnectivity or common control within the dynamic graph as a whole;

collapse the nodal set into a single super node that represents the one or more pair of nodes linked by an edge of a second nodal set as if it was a single resource pool within the dynamic graph;

monitor the current dynamic graph and identify a current malfeasance pattern from a portion of the current dynamic graph that includes the super node and matches at least one historical malfeasance pattern in a historical pattern database based on monitoring the current dynamic graph,
wherein the current malfeasance pattern is associated with a current set of nodes of the current plurality of nodes, a current set of edges of the current plurality of edges, or a combination of the current set of nodes and the current set of edges,
wherein the identifying a current malfeasance pattern comprises matching the current dynamic graph with the at least one historical malfeasance pattern at a plurality of hierarchical levels, wherein the plurality of hierarchical levels are associated with each of the current plurality of nodes or a group of the current plurality of nodes; and
in response to detecting the current malfeasance pattern, execute each remediation action on one or more of the second plurality of resource pools that are associated with the portion of the current dynamic graph associated with the malfeasance, wherein the remediation actions comprise:
block the second plurality of resource pools from sending resource distribution requests;
freeze the second plurality of resource pools from receiving subsequent one or more resource distribution requests;
prompt a sender of the subsequent one or more resource distribution requests to provide additional authentication credentials before executing the subsequent one or more resource distribution requests; and
transmit a notification associated with the second plurality of resource pools to a third party entity, wherein the notification comprises the current resource distribution request information.

2. The system of claim 1, wherein the one or more processing devices execute the computer-readable program code to:
extract historical resource distribution information for a first plurality of resource pools, wherein the historical resource distribution information is associated with historical resource distribution requests that occurred during a first period of time;
generate a historical dynamic graph comprising a plurality of nodes and a plurality of edges, wherein each of the plurality of nodes represents at least one of the first plurality of resource pools, and wherein each of the plurality of edges represent resource distribution information associated with a resource distribution event between two of the plurality of nodes, wherein the historical dynamic graph is a historical dynamic directed graph or a historical dynamic undirected graph;
identify, from the historical resource distribution information, a historical set of resource distribution events associated with a malfeasance;
determine, from the historical dynamic graph, the at least one historical malfeasance pattern of node characteristics, edge characteristics, and nodal interactions associated with the malfeasance, wherein the at least one historical malfeasance pattern is associated with a set of nodes of the plurality of nodes, a set of edges of the plurality of edges, or a combination of the set of nodes and the set of edges; and
store the at least one historical malfeasance pattern in the historical pattern database.

3. The system of claim 2, wherein the historical resource distribution information and the current resource distribution request information comprise resource distribution amount, resource distribution time, payor resource pool information, and payee resource pool information.

4. The system of claim 1, wherein identifying the current malfeasance pattern comprises at least identifying a match between one or more factors of the plurality of nodes associated with the first plurality of resource pools and the current plurality of nodes associated with the second plurality of resource pools, wherein the one or more factors comprise at least one of (1) reputation scores, (2) entropy values, (3) divergence values, (4) frequency of resource distribution requests, (5) timing of the resource distribution requests, (6) resource distribution amounts associated with the resource distribution requests, and (7) connectivity characteristics.

5. The system of claim 1, wherein the processing device is further configured to:
receive new set of current resource distribution request information associated with a new set of current resource distribution requests, wherein the new set of current resource distribution requests are associated with second plurality of resource distribution pools;
update the current dynamic graph based on the new set of current resource distribution request information; and
determine a new malfeasance pattern matching at least one other pattern stored in the historical pattern database.

6. A computer program product for a pattern-based examination and detection of malfeasance through dynamic graph network flow analysis, the computer program product comprising at least one non-transitory computer readable medium comprising computer readable instructions for:
receiving current resource distribution request information for a second plurality of resource pools, wherein the current resource distribution request information is associated with a current set of resource distribution requests, wherein the current set of resource distribution requests is updated continuously after the ending of a first period of time;
generating a current dynamic graph comprising a current plurality of nodes and a current plurality of edges, wherein each of the current plurality of nodes represents at least one of the second plurality of resource pools from the received current resource distribution request information, and wherein each of the current plurality of edges is associated with at least a net resource distribution amount and a net resource distribution direction between two of the current plurality of nodes, wherein the current dynamic graph is a dynamic directed graph or a dynamic undirected graph;
identifying, from the current dynamic graph, a nodal set of one or more pairs of nodes linked by an edge, based on the nodal set having an aggregate customer entropy and divergence value associated with interconnectivity or common control within the dynamic graph as a whole;
collapsing the nodal set into a single super node that represents the one or more pair of nodes linked by an edge of a second nodal set as if it was a single resource pool within the dynamic graph;

monitoring the current dynamic graph and identifying a current malfeasance pattern from a portion of the current dynamic graph that includes the super node and matches at least one historical malfeasance pattern in a historical pattern database based on monitoring the current dynamic graph,
   wherein the current malfeasance pattern is associated with a current set of nodes of the current plurality of nodes, a current set of edges of the current plurality of edges, or a combination of the current set of nodes and the current set of edges,
   wherein the identifying a current malfeasance pattern comprises matching the current dynamic graph with the at least one historical malfeasance pattern at a plurality of hierarchical levels, wherein the plurality of hierarchical levels are associated with each of the current plurality of nodes or a group of the current plurality of nodes; and
in response to detecting the current malfeasance pattern, executing each remediation action on one or more of the second plurality of resource pools that are associated with the portion of the current dynamic graph associated with the malfeasance, wherein the one or more remediation actions comprise:
   block the second plurality of resource pools from sending resource distribution requests;
   freeze the second plurality of resource pools from receiving subsequent one or more resource distribution requests;
   prompt a sender of the subsequent one or more resource distribution requests to provide additional authentication credentials before executing the subsequent one or more resource distribution requests; and
   transmit a notification associated with the second plurality of resource pools to a third party entity, wherein the notification comprises the current resource distribution request information.

7. The computer program product of claim 6, the at least one non-transitory computer readable medium comprising computer readable instructions for:
   extracting historical resource distribution information for a first plurality of resource pools, wherein the historical resource distribution information is associated with historical resource distribution requests that occurred during a first period of time;
   generating a historical dynamic graph comprising a plurality of nodes and a plurality of edges, wherein each of the plurality of nodes represents at least one of the first plurality of resource pools, and wherein each of the plurality of edges represent resource distribution information associated with a resource distribution event between two of the plurality of nodes, wherein the historical dynamic graph is a historical dynamic directed graph or a historical dynamic undirected graph;
   identifying, from the historical resource distribution information, a historical set of resource distribution events associated with a malfeasance;
   determining, from the historical dynamic graph, the at least one historical malfeasance pattern of node characteristics, edge characteristics, and nodal interactions associated with the malfeasance, wherein the at least one historical malfeasance pattern is associated with a set of nodes of the plurality of nodes, a set of edges of the plurality of edges, or a combination of the set of nodes and the set of edges; and
   storing the at least one historical malfeasance pattern in the historical pattern database.

8. The computer program product of claim 7, wherein the historical resource distribution information and the current resource distribution request information comprise resource distribution amount, resource distribution time, payor resource pool information, and payee resource pool information.

9. The computer program product of claim 6, wherein identifying the current malfeasance pattern comprises at least identifying a match between one or more factors of the plurality of nodes associated with the first plurality of resource pools and the current plurality of nodes associated with the second plurality of resource pools, wherein the one or more factors comprise at least one of (1) reputation scores, (2) entropy values, (3) divergence values, (4) frequency of resource distribution requests, (5) timing of the resource distribution requests, (6) resource distribution amounts associated with the resource distribution requests, and (7) connectivity characteristics.

10. The computer program product of claim 6, wherein the computer readable instructions further comprise instructions for:
   receiving new set of current resource distribution request information associated with a new set of current resource distribution requests, wherein the new set of current resource distribution requests are associated with second plurality of resource distribution pools;
   updating the current dynamic graph based on the new set of current resource distribution request information; and
   determining a new malfeasance pattern matching at least one other pattern stored in the historical pattern database.

11. A computer implemented method for a pattern-based examination and detection of malfeasance through dynamic graph network flow analysis, the computer implemented method comprising:
   providing a computing system comprising a computer processing device and a non-transitory computer readable medium, where the computer readable medium comprises configured computer program instruction code, such that when said instruction code is operated by said computer processing device, said computer processing device performs operations of:
      receiving current resource distribution request information for a second plurality of resource pools, wherein the current resource distribution request information is associated with a current set of resource distribution requests, wherein the current set of resource distribution requests is updated continuously after the ending of a first period of time;
      generating a current dynamic graph comprising a current plurality of nodes and a current plurality of edges, wherein each of the current plurality of nodes at least one of the second plurality of resource pools from the received current resource distribution request information, and wherein each of the current plurality of edges is associated with at least a net resource distribution amount and a net resource distribution direction between two of the current plurality of nodes, wherein the current dynamic graph is a dynamic directed graph or a dynamic undirected graph;
      identifying, from the current dynamic graph, a nodal set of one or more pairs of nodes linked by an edge, based on the nodal set having an aggregate customer entropy and divergence value associated with interconnectivity or common control within the dynamic graph as a whole;

collapsing the nodal set into a single super node that represents the one or more pair of nodes linked by an edge of a second nodal set as if it was a single resource pool within the dynamic graph;

monitoring the current dynamic graph and identifying a current malfeasance pattern from a portion of the current dynamic graph that includes the super node and matches at least one historical malfeasance pattern in a historical pattern database based on monitoring the current dynamic graph, wherein the current malfeasance pattern is associated with a current set of nodes of the current plurality of nodes, a current set of edges of the current plurality of edges, or a combination of the current set of nodes and the current set of edges, wherein the identifying a current malfeasance pattern comprises matching the current dynamic graph with the at least one historical malfeasance pattern at a plurality of hierarchical levels, wherein the plurality of hierarchical levels are associated with each of the current plurality of nodes or a group of the current plurality of nodes; and in response to detecting the current malfeasance pattern, executing each remediation action on one or more of the second plurality of resource pools that are associated with the portion of the current dynamic graph associated with the malfeasance, wherein executing one or more remediation actions further comprises:

blocking the second plurality of resource pools from sending resource distribution requests;

freezing the second plurality of resource pools from receiving subsequent one or more resource distribution requests;

prompting a sender of the subsequent one or more resource distribution requests to provide additional authentication credentials before executing the subsequent one or more resource distribution requests; and transmitting a notification associated with the second plurality of resource pools to a third party entity, wherein the notification comprises the current resource distribution request information.

12. The computer implemented method of claim 11, wherein the method further comprises:

extracting historical resource distribution information for a first plurality of resource pools, wherein the historical resource distribution information is associated with historical resource distribution requests that occurred during a first period of time;

generating a historical dynamic graph comprising a plurality of nodes and a plurality of edges, wherein each of the plurality of nodes represents at least one of the first plurality of resource pools, and wherein each of the plurality of edges represent resource distribution information associated with a resource distribution event between two of the plurality of nodes;

identifying, from the historical resource distribution information, a historical set of resource distribution events associated with a malfeasance;

determining, from the historical dynamic graph, the at least one historical malfeasance pattern of node characteristics, edge characteristics, and nodal interactions associated with the malfeasance, wherein the at least one historical malfeasance pattern is associated with a set of nodes of the plurality of nodes, a set of edges of the plurality of edges, or a combination of the set of nodes and the set of edges, wherein the historical dynamic graph is a historical dynamic directed graph or a historical dynamic undirected graph; and storing the at least one historical malfeasance pattern in the historical pattern database.

13. The computer implemented method of claim 11, wherein identifying the current malfeasance pattern comprises at least identifying a match between one or more factors of the plurality of nodes associated with the first plurality of resource pools and the current plurality of nodes associated with the second plurality of resource pools, wherein the one or more factors comprise at least one of (1) reputation scores, (2) entropy values, (3) divergence values, (4) frequency of resource distribution requests, (5) timing of the resource distribution requests, (6) resource distribution amounts associated with the resource distribution requests, and (7) connectivity characteristics.

14. The computer program product of claim 11, wherein the computer readable instructions further comprise instructions for:

receiving new set of current resource distribution request information associated with a new set of current resource distribution requests, wherein the new set of current resource distribution requests are associated with second plurality of resource distribution pools;

updating the current dynamic graph based on the new set of current resource distribution request information; and determining a new malfeasance pattern matching at least one other pattern stored in the historical pattern database.

* * * * *